US011068812B2

(12) United States Patent
Tsuzuki et al.

(10) Patent No.: US 11,068,812 B2
(45) Date of Patent: Jul. 20, 2021

(54) WORK INSTRUCTION SYSTEM

(71) Applicant: JTEKT CORPORATION, Osaka (JP)

(72) Inventors: Toshiyuki Tsuzuki, Anjo (JP); Toshio Aono, Chiryu (JP)

(73) Assignee: JTEKT CORPORATION, Osaka (JP)

( * ) Notice: Subject to any disclaimer, the term of this patent is extended or adjusted under 35 U.S.C. 154(b) by 467 days.

(21) Appl. No.: 15/496,118

(22) Filed: Apr. 25, 2017

(65) Prior Publication Data

US 2017/0308842 A1 Oct. 26, 2017

(30) Foreign Application Priority Data

Apr. 26, 2016 (JP) .............................. JP2016-088502
Apr. 26, 2016 (JP) .............................. JP2016-088504
Apr. 26, 2016 (JP) .............................. JP2016-088505

(51) Int. Cl.
  *G06Q 10/06* (2012.01)
(52) U.S. Cl.
  CPC ............... *G06Q 10/063112* (2013.01); *G06Q 10/06312* (2013.01); *G06Q 10/06316* (2013.01); *G06Q 10/06398* (2013.01)
(58) Field of Classification Search
  CPC ..... G06Q 10/063112; G06Q 10/06398; G06Q 10/06311; G06Q 10/06312; G06Q 10/06316; G05B 19/41865; G05B 2219/32252
  See application file for complete search history.

(56) References Cited

U.S. PATENT DOCUMENTS 5,255,181 A * 10/1993 Chapman ............... G06Q 10/06
  705/7.25
5,913,201 A *  6/1999 Kocur .................... G06Q 10/04
  705/7.17
(Continued)

FOREIGN PATENT DOCUMENTS

CN  1836477 A   9/2006
JP  63-150140 A  6/1988
(Continued)

OTHER PUBLICATIONS

Office Action dated Feb. 4, 2020 in Japanese Application No. 2016-088505, along with a partial English translation.
(Continued)

*Primary Examiner* — Matthew S Gart
*Assistant Examiner* — Stephen S Swartz
(74) *Attorney, Agent, or Firm* — Oblon, McClelland, Maier & Neustadt, L.L.P.

(57) ABSTRACT

A work instruction system for a facility including processing machines is configured to provide work instructions on the processing machines to workers. The work instruction system includes a process plan storage section configured to store a process plan that defines a performing sequence regarding processing performed by the processing machines and work on the processing machines performed by the workers; a next work candidate extraction section configured to extract next work candidates for the workers based on current states of the processing machines and the process plan; a capacity database configured to store work capacity of each worker with regard to each work type; and a next work determination section configured to determine next work for a specified worker from among the next work candidates, based on the work capacity stored in the capacity database.

20 Claims, 14 Drawing Sheets

(56) References Cited

U.S. PATENT DOCUMENTS

| | | | | |
|---|---|---|---|---|
| 8,200,527 | B1* | 6/2012 | Thompson | G06Q 10/0639 |
| | | | | 705/7.39 |
| 8,548,838 | B1* | 10/2013 | Ganesan | G06Q 10/06311 |
| | | | | 705/7.13 |
| 9,245,241 | B2* | 1/2016 | Kite | G06Q 10/06 |
| 9,720,737 | B2* | 8/2017 | Ashtiani | G06Q 10/06 |
| 10,062,042 | B1* | 8/2018 | Kelly | G06Q 10/063112 |
| 2005/0076052 | A1* | 4/2005 | Kojima | G06Q 30/06 |
| 2005/0154625 | A1 | 7/2005 | Chua et al. | |
| 2006/0200264 | A1 | 9/2006 | Kodama et al. | |
| 2006/0282189 | A1* | 12/2006 | Akisawa | G05B 19/41865 |
| | | | | 700/110 |
| 2007/0136117 | A1* | 6/2007 | Matsueda | G06Q 10/06 |
| | | | | 358/1.15 |
| 2012/0053977 | A1* | 3/2012 | Bagheri | G06Q 10/063112 |
| | | | | 705/7.14 |
| 2012/0084031 | A1* | 4/2012 | Saito | G06Q 50/00 |
| | | | | 702/62 |
| 2014/0195290 | A1* | 7/2014 | Plost | G06Q 10/063116 |
| | | | | 705/7.16 |
| 2014/0195295 | A1* | 7/2014 | Whitley | G06Q 10/0633 |
| | | | | 705/7.27 |
| 2016/0196524 | A1* | 7/2016 | Ito | G06Q 10/063112 |
| | | | | 705/7.14 |

FOREIGN PATENT DOCUMENTS

| | | | | |
|---|---|---|---|---|
| JP | 63-267145 | A | | 11/1988 |
| JP | 04-046749 | A | | 2/1992 |
| JP | 10-198484 | A | | 7/1998 |
| JP | 63-262177 | A | | 10/1998 |
| JP | 11-96011 | | | 4/1999 |
| JP | 11-129147 | A | | 5/1999 |
| JP | 11-353365 | A | | 12/1999 |
| JP | 2000214905 | A * | 8/2000 | G06Q 50/04 |
| JP | 2002-157010 | A | | 5/2002 |
| JP | 2002-297216 | A | | 10/2002 |
| JP | 2004-127170 | | | 4/2004 |
| JP | 2004355172 | A * | 12/2004 | G06Q 50/04 |
| JP | 2004355172 | A1 * | 12/2004 | G05B 19/418 |
| JP | 2005-182685 | A | | 7/2005 |
| JP | 2005-276003 | A | | 10/2005 |
| JP | 2007-293690 | | | 11/2007 |
| JP | 4321020 | B2 * | 8/2009 | G06Q 10/06 |
| JP | 2009-289134 | A | | 12/2009 |
| JP | 2010-026888 | A | | 2/2010 |
| JP | 2010-97490 | | | 4/2010 |
| JP | 2011-107836 | A | | 6/2011 |
| JP | 2012-174098 | A | | 9/2012 |
| JP | 201448897 | A * | 3/2014 | G06Q 50/04 |
| JP | 2014-178449 | | | 9/2014 |
| JP | 2015-108867 | | | 6/2015 |

OTHER PUBLICATIONS

Planning and Management for Process JSME Mechanical Engineers' Handbook Japan Society of Mechanical Engineers, 6th Edition.

Office Action dated Feb. 18, 2020 in Japanese Application No. 2016-088504, along with a partial English translation.

Office Action dated Mar. 10, 2020 in Japanese Application No. 2016-088502, along with a partial English translation.

Japanese Office Action dated Sep. 23, 2020 in corresponding Japanese Patent Application No. 2016-088502 (with partial English translation), 8 pages.

The First Office Action dated Mar. 1, 2021 in corresponding Chinese Patent Application No. 201710281315.1 (with English translation)(22 pages).

Japanese Office Action dated Sep. 29, 2020 in corresponding Japanese Patent Application No. 2016-086502 (with partial English translation), 8 pages.

* cited by examiner

FIG. 7A

| WORK CAPACITY | | | | | | | | | |
|---|---|---|---|---|---|---|---|---|---|
| WORK TYPE | | WORKER | | | | | | | |
| | | Mr. A | | Mr. B | | Mr. C | | Mr. D | |
| SETUP | MC1 | ○ | 00:10 | ○ | 00:15 | × | | ○ | 00:11 |
| | MC2 | ○ | 00:10 | × | | ○ | 00:18 | ○ | 00:11 |
| | MC3 | ○ | 00:10 | ○ | 00:15 | × | | ○ | 00:11 |
| | MC4 | ○ | 00:10 | × | | ○ | 00:18 | ○ | 00:11 |
| | MC5 | ○ | 00:10 | ○ | 00:15 | × | | ○ | 00:11 |
| | MC6 | ○ | 00:10 | × | | ○ | 00:18 | ○ | 00:11 |
| | MC7 | ○ | 00:10 | ○ | 00:15 | × | | ○ | 00:11 |
| | MC8 | ○ | 00:10 | × | | ○ | 00:18 | ○ | 00:11 |
| MALFUNCTION RECOVERY | MC1 | ○ | 00:10 | ○ | 00:15 | × | | × | |
| | MC2 | ○ | 00:10 | × | | ○ | 00:18 | × | |
| | MC3 | ○ | 00:10 | ○ | 00:15 | × | | × | |
| | MC4 | ○ | 00:10 | × | | ○ | 00:18 | × | |
| | MC5 | ○ | 00:10 | ○ | 00:15 | × | | × | |
| | MC6 | ○ | 00:10 | × | | ○ | 00:18 | × | |
| | MC7 | ○ | 00:10 | ○ | 00:15 | × | | × | |
| | MC8 | ○ | 00:10 | × | | ○ | 00:18 | × | |

| WORK CAPACITY | | | | | | 57 |
|---|---|---|---|---|---|---|
| WORK TYPE | | WORKER | | | | |
| | | Mr. A | Mr. B | Mr. C | Mr. D | |
| SETUP | MC1 | ○ 00:10 | ○ 00:15 | × | ○ 00:11 | |
| | MC2 | ○ 00:10 | △ 00:21 | ○ 00:18 | ○ 00:11 | |
| | MC3 | ○ 00:10 | ○ 00:15 | × | ○ 00:11 | |
| | MC4 | ○ 00:10 | × | ○ 00:18 | ○ 00:11 | |
| | MC5 | ○ 00:10 | ○ 00:15 | △ 00:21 | ○ 00:11 | |
| | MC6 | ○ 00:10 | △ 00:21 | ○ 00:18 | ○ 00:11 | |
| | MC7 | ○ 00:10 | ○ 00:15 | △ 00:21 | ○ 00:11 | |
| | MC8 | ○ 00:10 | × | ○ 00:18 | ○ 00:11 | |
| MALFUNCTION RECOVERY | MC1 | ○ 00:10 | ○ 00:15 | × | △ 00:21 | |
| | MC2 | ○ 00:10 | △ 00:21 | ○ 00:18 | × | |
| | MC3 | ○ 00:10 | ○ 00:15 | × | △ 00:21 | |
| | MC4 | ○ 00:10 | × | ○ 00:18 | × | |
| | MC5 | ○ 00:10 | ○ 00:15 | △ 00:21 | × | |
| | MC6 | ○ 00:10 | △ 00:21 | ○ 00:18 | × | |
| | MC7 | ○ 00:10 | ○ 00:15 | △ 00:21 | × | |
| | MC8 | ○ 00:10 | × | ○ 00:18 | × | |

FIG. 8

| WORKER | WORK TYPE | | | WORK TIME | MACHINE WORK TIME | POSITION INFORMATION | BIOLOGICAL INFORMATION | ACCELERATION INFORMATION | IMAGING INFORMATION (WORKER) | IMAGING INFORMATION (MACHINE) | OPERATION PROCEDURE INFORMATION |
|---|---|---|---|---|---|---|---|---|---|---|---|
| | TARGET TYPE | MACHINE TYPE | WORK TYPE | | | | | | | | |
| Mr. A | TARGET 1 | MC3 | MALFUNCTION RECOVERY | | | | | | | | |
| | TARGET 1 | MC3 | SETUP | | | | | | | | |
| | TARGET 1 | MC4 | SETUP | | | | | | | | |
| | TARGET 2 | MC2 | TEST CUTTING | | | | | | | | |
| | ... | | | | | | | | | | |
| Mr. B | TARGET 1 | MC1 | SETUP | | | | | | | | |
| | TARGET 1 | MC3 | SETUP | | | | | | | | |
| | TARGET 2 | MC5 | MALFUNCTION RECOVERY | | | | | | | | |
| | ... | | | | | | | | | | |

FIG. 11

| WORKER | WORK START INFORMATION | | WORK FINISH INFORMATION | | | WORKING/ FINISHED STATE |
|---|---|---|---|---|---|---|
| | WORK START INPUT TIME | HP WORK START ESTIMATED TIME | WORK FINISH INPUT TIME | HP WORK FINISH ESTIMATED TIME | HP WORK FINISH PREDICTED TIME | |
| Mr. A | 23:03 | 23:03 | | | 23:35 | WORKING |
| Mr. B | | | 23:10 | 23:15 | | FINISHED |
| Mr. C | | | 22:57 | 22:57 | | FINISHED |
| Mr. D | 22:59 | 23:05 | | | 23:40 | WORKING |

WORK INSTRUCTION SYSTEM

INCORPORATION BY REFERENCE

The disclosure of Japanese Patent Application No. 2016-088502 filed on Apr. 26, 2016, Japanese Patent Application No. 2016-088504 filed on Apr. 26, 2016, and Japanese Patent Application No. 2016-088505 filed on Apr. 26, 2016, each including the specification, drawings and abstract, is incorporated herein by reference in its entirety.

BACKGROUND

1. Technical Field

The disclosure relates to a work instruction system.

2. Description of Related Art

A production facility including a plurality of processing machines (for example, a machine tool, and an industrial robot) is operated in accordance with a production plan for a plurality of production targets (i.e., objects to be produced). Examples of the production facility include a fully automated facility in which no worker is involved, and a non-fully automated facility in which a worker is involved. In the non-fully automated facility, in order to perform processing by the plurality of processing machines, the worker may perform several types of work that include tooling changes for the processing machine, carrying in/out of the target, an activation operation on the processing machine, and so on.

For this reason, a process plan, which defines a performing sequence regarding the processing performed by the plurality of processing machines and work on the plurality of processing machines performed by the workers, is determined on the basis of the production plan. Then, the worker performs the work in accordance with the process plan. As the work performed by the workers in the process plan, for example, the tooling changes for the processing machine, the carrying-in of the target to the processing machine, and the activation operation on the processing machine are sequentially performed. Thereafter, the processing is performed by the processing machine.

When there are a large number of the processing machines that constitute the facility, the plurality of workers work in the facility. Work capacity differs depending on each worker. While an experienced worker can perform all types of the work, an inexperienced worker can perform only a particular type(s) of the work. In addition, a time required for the work differs depending on each worker. In general, in the process plan, the work performed by the worker is determined on the basis of standard work time. However, there is a case where the inexperienced worker needs longer work time than the standard work time, which may causes a delay in the process plan. Thus, it is required to assign the work to the workers in accordance with a proficiency level of each of the workers.

Japanese Patent Application Publication No. 11-96011 (JP 11-96011 A) discloses an autonomous cooperative control apparatus that improves communication efficiency among workers and selection efficiency of the workers, and thereby performs tasks at a high speed. This apparatus includes work flow management means that determines a work procedure based on a state of a control target and manages performance of the work procedure; work performing means that divides the work commanded from the work flow management means into tasks and manages task processing; processing capacity determination means that assists in control of the task processing by comparing an attribute of the task with the capacity of the worker in a system during the control of the task processing performed by the work performing means; and learning means that changes a capacity value of each of the workers on the basis of a result obtained after the work performing means finishes performing.

Japanese Patent Application Publication No. 2015-108867 (JP 2015-108867 A) discloses a management device that is used to assign the work to a plurality of workers having their own capacities. The management device includes a participating worker determination section that determines a first worker who participates in the work; a command determination section that determines the work to be performed by the first worker and a command specifying an instruction to be followed at a time when the work is performed; and a notification section that notifies the first worker of the command. The command determination section includes a temporal determination section that determines a temporal command; a predicted time acquisition section that obtains a predicted time required for the first worker to finish the work indicated by the temporal command; a change determination section that determines whether to change contents of the temporal command by comparing the predicted time and a specified threshold; and an optimization section that causes the temporal determination section to determine a new temporal command when it is determined that the contents of the temporal command should be changed, and determines the temporal command as a command notified to the first worker when it is determined that the contents of the temporal command should not be changed.

Japanese Patent Application Publication No. 2014-178449 (JP 2014-178449 A) discloses an education aid apparatus that efficiently contributes to education of workers in accordance with a situation. The education aid apparatus includes a capacity information acquisition section that obtains capacity information related to capacity of one, two, or more workers; a work history acquisition section that obtains work history information related to work history of the one, two, or more workers; a work request history acquisition section that obtains work request history information related to work requests from one, two, or more clients; and an education priority determination section that determines priorities of educational contents for each of the workers on the basis of the capacity information, the work history information, and the work request history information.

SUMMARY

In the case where the process plan is set for the non-fully automated facility including the plurality of processing machines and the plurality of workers work in the facility, it is required to give an appropriate work instruction to each of the plurality of workers. However, since the apparatuses disclosed in the above patent documents are provided for targets different from the above-described facility including the plurality of processing machines, the apparatuses disclosed in the above patent documents cannot be applied in the above-described case.

The disclosure provides a work instruction system that is provided for a facility including a plurality of processing machines and that can provide an appropriate work instruction on the plurality of processing machines to each of a plurality of workers.

According to an aspect of the disclosure relates to a work instruction system for a facility including a plurality of processing machines, the work instruction system configured to provide work instructions on the plurality of processing machines to a plurality of workers. The work instruction system includes a process plan storage section configured to store a process plan that defines a performing sequence regarding processing performed by the plurality of processing machines and work on the plurality of processing machines performed by the plurality of workers; a next work candidate extraction section configured to extract a plurality of next work candidates for the plurality of workers based on current states of the plurality of processing machines and the process plan; a capacity database configured to store work capacity of each of the plurality of workers with regard to each of a plurality of work types; and a next work determination section configured to determine next work for a specified worker from among the plurality of next work candidates, based on the work capacity stored in the capacity database.

The process plan defines the performing sequence regarding the processing performed by the plurality of processing machines and the work on the plurality of processing machines performed by the plurality of workers. For example, in the process plan for a first processing machine, the performing sequence is defined as work A performed by the worker→processing B performed by the first processing machine→work C performed by the worker→processing D performed by the first processing machine. The same applies to the other processing machines. In addition, because the facility includes the plurality of processing machines, the process plan for the entire facility is set such that the processing machines perform processing in parallel and the workers perform work on the processing machines in parallel.

Accordingly, with regard to the entire facility, for example, there is a case where the work A should be continuously performed, and there is also a case where the work A and the work C should be alternately performed. In addition, there is a case where the work A should be concurrently performed by a plurality of workers. In view of this, the next work candidate extraction section according to the above-described aspect of the disclosure determines the plurality of next work candidates for the plurality of workers, for example, at a current time point. Then, the next work determination section determines the next work for the specified worker from among the next work candidates.

Note that, when determining the next work, the next work determination section takes the work capacity, which is stored in the capacity database, into consideration. The capacity database stores the work capacity of each of the plurality of workers with regard to each of the plurality of work types. For example, there is a case where the plurality of workers can perform the work A while only a particular worker can perform the work C. Such information is stored in the capacity database.

That is, the next work determination section determines the next work for the specified worker from among the next work candidates, based on the work capacity of each of the workers. For example, in the case where the work A, which can be performed by the specified worker, and the work C, which cannot be performed by the specified worker, are present as the work that should be performed currently, the next work determination section can instruct the specified worker to perform the work A and instruct the other worker to perform the work C. Thus, when the specified worker is brought into a state in which the specified worker is able to start a next work, the specified worker is instructed to perform the work that can be performed by the specified worker.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 7A is a view of a first example of work capacity of a worker that is stored in a capacity database in FIG. 4;

FIG. 7B is a view of a second example of the work capacity of the worker that is stored in the capacity database in FIG. 4;

FIG. 8 is a table showing work achievement information on the worker that is stored in the capacity database in FIG. 4;

FIG. 11 is a table showing information obtained by an all workers' states acquisition section in FIG. 4;

DETAILED DESCRIPTION OF EMBODIMENTS

Figure 1:
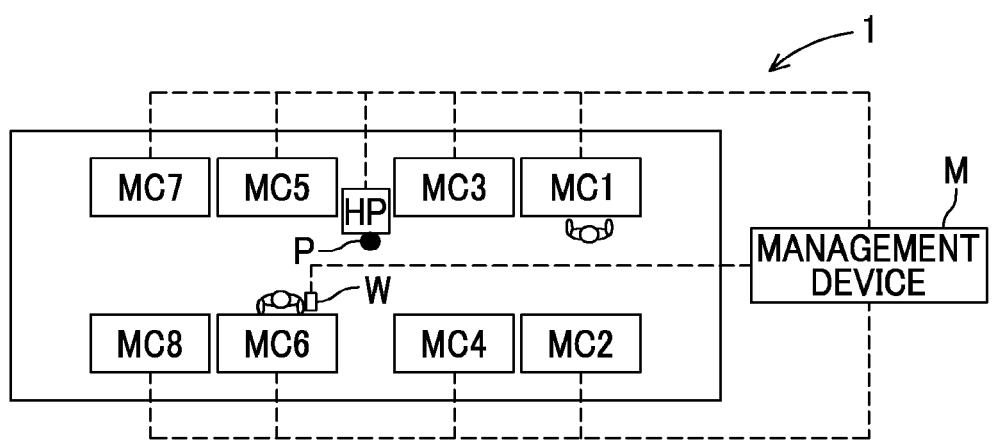
FIG. 1 is a view of arrangement of facility in an embodiment.

Referring to FIG. 1, a description will be provided on a configuration of a facility 1 as a work instruction system in an embodiment of the disclosure. The work instruction system is a system that provides a work instruction on a plurality of processing machines MC1 to MC8 to each of a plurality of workers. In other words, a description will be provided on the configuration of the facility 1, to which the capacity database construction device according to the embodiment of the disclosure is applied. In other words, referring to FIG. 1, a description will be provided on the configuration of the facility 1, to which the process plan formulation device according to the embodiment of the disclosure is applied. The facility 1 is, for example, a production facility that produces various targets (objects), a logistic facility that transports the targets (objects), or the like. In this embodiment, a production facility that performs machining is described as an example of the facility 1. The facility 1 is a non-fully automated facility in which the workers are involved. In other words, the processing machines MC1 to MC8, which constitute the facility 1, are not fully automated. Rather, the facility 1 requires work on each of the processing machines MC1 to MC8 by the workers.

As shown in FIG. 1, the facility 1 includes the eight processing machines MC1 to MC8, a home terminal HP, a plurality of mobile terminals W, and a management device M. The production target (i.e., the object to be produced) is a cylindrical member, for example.

The processing machines MC1 to MC8 are machine tools such as a machining center, a lathe, and a grinder, and an order of the processing machines MC1 to MC8 corresponds to a process order. The processing machines MC1 to MC8 are arranged in two rows and are also arranged such that front surfaces of some of the processing machines MC1 to MC8 in the one row face front surfaces of the rest of the processing machines MC1 to MC8 in the other row.

The processing machines MC1 to MC8 sequentially include: a lathe that performs rough machining of an outer shape of a workpiece; a grinder that performs semi-finishing of the outer shape thereof; a lathe that performs rough machining of an inner shape thereof; a grinder that performs semi-finishing of the inner shape thereof; a grinder that performs finishing of a straight portion in the outer shape thereof; a grinder that performs finishing of a tapered portion in the outer shape thereof, a grinder that performs finishing of a straight portion in the inner shape thereof; and a grinder that performs finishing of a tapered portion in the inner shape thereof.

The home terminal HP is installed at a home position P in the facility 1. The home position P serves as a reference position of the facility 1 and is defined from the perspective of the work. Here, the home terminal HP is a device which provides a work instruction to the worker and on which the worker performs input processing for work start information and work finish information. The worker performs the input processing on the home terminal HP every time the work is started and finished. For this reason, in view of a moving distance of the worker, the home position P, at which the home terminal HP is installed, is situated in the vicinity of center of the entire facility 1. Note that the home position P, at which the home terminal HP is installed, is not limited to the vicinity of the center of the facility 1 and is appropriately determined in accordance with the arrangement of the processing machines MC1 to MC8, which constitute the facility 1.

The mobile terminal W is a terminal that has the same function as the function of the home terminal HP and can be carried by the worker. That is, the mobile terminal W is a device which provides the work instruction to the worker and on which the worker performs the input processing for the work start information and the work finish information. The mobile terminal W may be of a handy type or a wearable type. Examples of the handy type include non-wearable devices such as a tablet, a mobile phone, and a smartphone. Examples of the wearable type include an armband type, a glasses type, an earphone type, and a helmet attachment type.

Because the home terminal HP and the mobile terminal W have the same function, either one of those can be selectively used. When both of those are used, for example, an inexperienced worker may use only the home terminal HP, and an experienced worker may be able to use both of the home terminal HP and the mobile terminal W. As it will be described below, work time is estimated as one kind of work capacity. Accordingly, when the mobile terminal W is used, the work capacity of the worker cannot be accurately determined. For this reason, the use of the mobile terminal W may be allowed after the work capacity of the worker is stabilized to a certain extent, that is, the worker becomes the experienced worker.

The management device M manages the processing by the processing machines MC1 to MC8 and the work on the processing machines MC1 to MC8 performed by the workers. In detail, the management device M has an operation achievement determining function, a formulating function for an updated process plan, a next work instructing function for the worker, and a constructing function for a workers' capacity database (corresponding to a capacity database construction device of the disclosure). The management device M is connected to the processing machines MC1 to MC8 and the home terminal HP via a wired or wireless communication network. The management device M is connected to the mobile terminal W via the wireless communication network.

Figure 2:
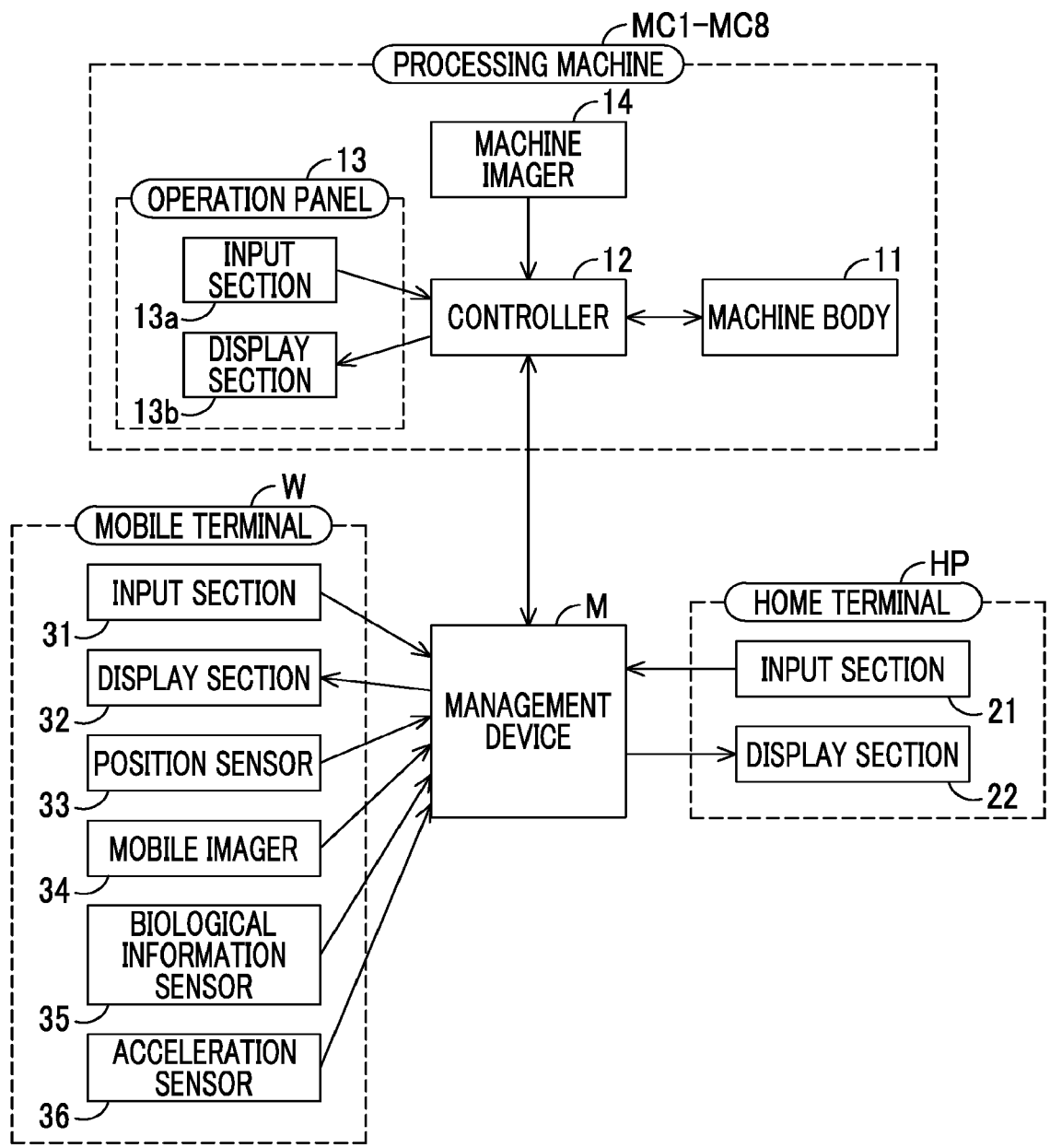
FIG. 2 is a view of an internal configuration of the facility.

Next, referring to FIG. 2, a description will be provided on internal configurations of the processing machines MC1 to MC8, the home terminal HP, and the mobile terminal W.

The processing machines MC1 to MC8 each include a machine body 11, a controller 12, an operation panel 13, and a machine imager 14. The operation panel 13 includes an input section 13*a* and a display section 13*b*. The machine imager 14 is a device that captures an image around corresponding one of the processing machines MC1 to MC8 and particularly captures information on the motion of the worker. The home terminal HP includes an input section 21 and a display section 22. The mobile terminal W includes an input section 31, a display section 32, a position sensor 33, a mobile imager 34, a biological information sensor 35, and an acceleration sensor 36. The input section 13*a* of the operation panel 13, the input section 21 of the home terminal HP, and the input section 31 of the mobile terminal W are each a touch panel or a mechanical button to which input can be performed by a touch operation, or the like. The position sensor 33 of the mobile terminal W is a sensor that recognizes a position of the mobile terminal W itself in the facility 1, and is a GPS sensor, for example. The mobile imager 34 captures an image of a view of the worker. The biological information sensor 35 detects pulse waveforms and respiratory waveforms of the worker. The acceleration sensor 36 detects a signal corresponding to motion of the worker (for example, a walking state, and a standing state).

Figure 3A:
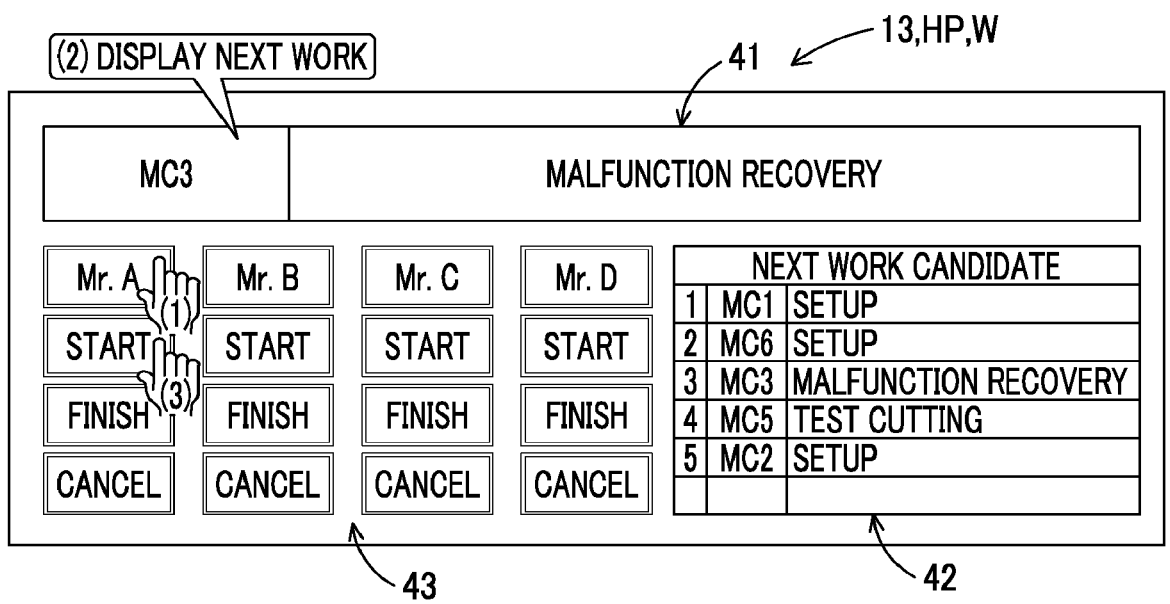
FIG. 3A is a view of an operation procedure and contents displayed on each of worker terminals (a home terminal, a mobile terminal, and an operation panel) in FIG. 2 when work is started.
Figure 3B:
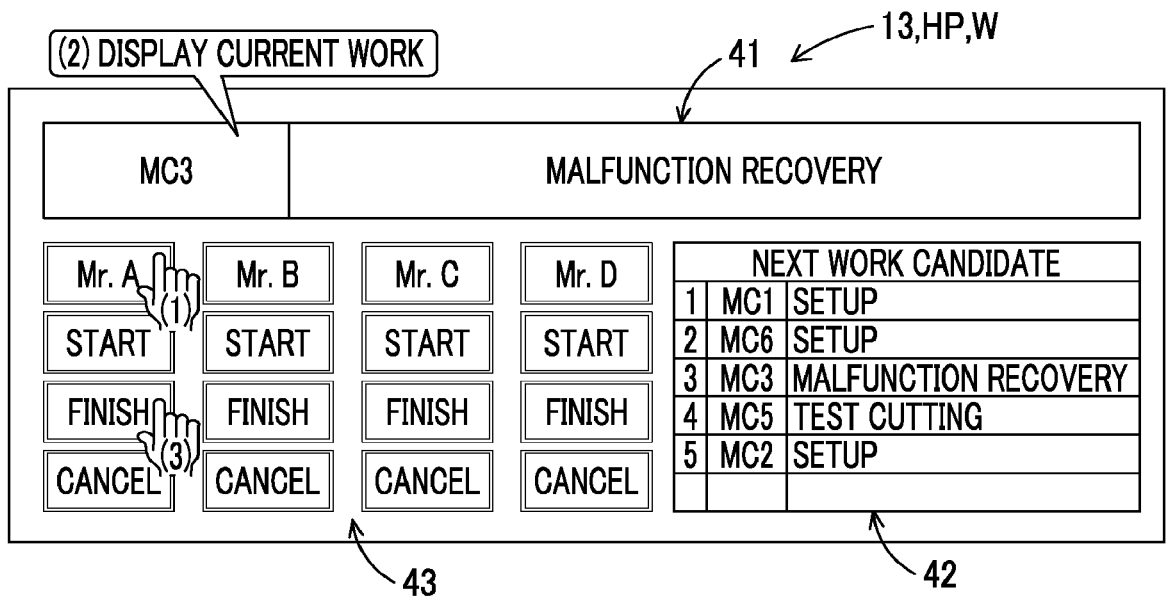
FIG. 3B is a view of the operation procedure and the contents displayed on each of the worker terminals (the home terminal, the mobile terminal, and the operation panel) in FIG. 2 when the work is finished.

The operation panel 13, the home terminal HP, and the mobile terminal W are devices, each of which provides the instruction to the worker and on each of which the worker performs the input processing. Accordingly, in the following description, the operation panel 13, the home terminal HP, and the mobile terminal W will hereinafter collectively be referred to as worker terminals 13, HP, W. Referring to FIG. 3A and FIG. 3B, a description will be provided on configurations of the worker terminals 13, HP, W.

As shown in FIG. 3A and FIG. 3B, the worker terminals 13, HP, W each include: a work display column 41 that displays next work or current work; a candidate column 42 that displays a list of next work candidates; and an input column 43 that displays worker name buttons as well as a start button, a finish button, and a cancellation button for each of the workers.

The work display column 41 displays one of the processing machines MC1 to MC8 as a work target and a work type.

Furthermore, as shown in FIG. 3A, the work display column 41 also functions as a column that indicates the next work to the worker who is about to start the next work, and, as shown in FIG. 3B, also functions as a column that displays the current work to the worker who is about to perform finish processing for the current work.

The candidate column 42 displays the work that can be currently performed by the worker (hereinafter referred to as next work candidates), and also displays the processing machines MC1 to MC8 as the work targets and the work types. Furthermore, when the plurality of next work candidates are displayed in the candidate column 42, a priority order thereof is also displayed.

Next, referring to FIG. 3A, a description will be provided on an operation procedure performed by the worker when the worker starts the next work. Here, the next work candidates that can be currently performed are constantly displayed in the candidate column 42 of each of the worker terminals 13, HP, W. The worker who does not currently perform any work touches the worker name button indicating his/her name on any of the worker terminals 13, HP, W (indicated by (1) in FIG. 3A). Then, the next work is displayed in the work display column 41 on any of the worker terminals 13, HP, W (indicated by (2) in FIG. 3A). This next work is one of the next work candidates displayed in the candidate column 42. That is, the worker terminals 13, HP, W indicate the next work to the worker. Next, the worker touches the start button (indicated by (3) in FIG. 3A), and starts performing the indicated next work.

Next, referring to FIG. 3B, a description will be provided on an operation procedure performed by the worker when the worker finishes the current work. The worker who has finished the work on any of the processing machines MC1 to MC8 touches the worker name button indicating his/her name on any of the worker terminals 13, HP, W (indicated by (1) in FIG. 3B). Then, the currently performed work is displayed in the work display column 41 on any of the worker terminals 13, HP, W (indicated by (2) in FIG. 3B). That is, the worker can confirm the currently performed work in the work display column 41. Next, the worker completely finishes the currently performed work by touching the finish button (indicated by (3) in FIG. 3B) or by a signal from the corresponding one of the processing machines MC1 to MC8, or the like.

Figure 4:
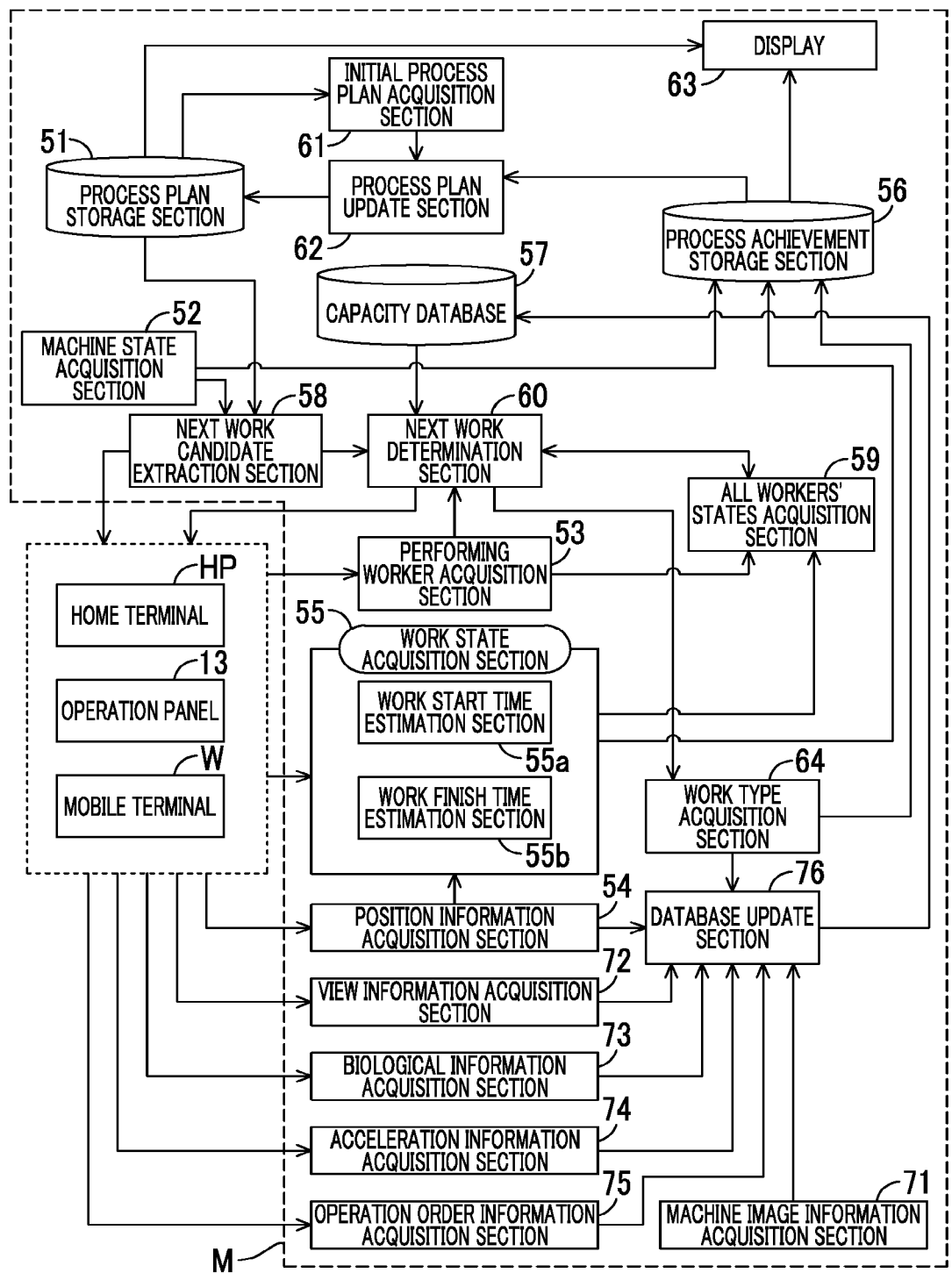
FIG. 4 shows a configuration of a management device shown in FIG. 1 and FIG. 2.

Next, referring to FIG. 4, a description will be provided on an overview of the management device M. As shown in FIG. 4, the management device M includes a process plan storage section 51, a machine state acquisition section 52, a performing worker acquisition section 53, a position information acquisition section 54, a work state acquisition section 55, a process achievement storage section 56, a capacity database 57, a next work candidate extraction section 58, an all workers' states acquisition section 59, a next work determination section 60, an initial process plan acquisition section 61, a process plan update section 62, a display 63, a work type acquisition section 64, a machine image information acquisition section 71, a view information acquisition section 72, a biological information acquisition section 73, an acceleration information acquisition section 74, an operation order information acquisition section 75, and a database update section 76.

Of the sections that constitute the management device M, the machine state acquisition section 52 obtains information on current states (operation states) of the processing machines MC1 to MC8 from the controllers 12 of the processing machines MC1 to MC8. The machine image information acquisition section 71 obtains information captured by the machine imagers 14 of the processing machines MC1 to MC8. The performing worker acquisition section 53, the position information acquisition section 54, the work state acquisition section 55, the view information acquisition section 72, the biological information acquisition section 73, the acceleration information acquisition section 74, and the operation order information acquisition section 75 respectively obtain information on the performing worker, position information, information on a work state, view information, biological information, acceleration information, and operation order information from the worker terminals 13, HP, W. The performing worker acquisition section 53 obtains information on the worker whose name button on any of the worker terminals 13, HP, W is touched, as the information on the performing worker. That is, the performing worker acquisition section 53 obtains information on ID of the worker who performs the work (the worker's name and the like). The rest of the sections that constitute the management device M are portions that perform processing in the management device M and will be described in detail below.

Here, as described above, the management device M has the operation achievement determining function, the formulating function for the updated process plan (corresponding to a process plan formulation device of the disclosure), the next work instructing function for the worker, and the constructing function for the workers' capacity database (corresponding to a capacity database construction device of the disclosure). The operation achievement determining function includes the process plan storage section 51, the machine state acquisition section 52, the position information acquisition section 54, the work state acquisition section 55, the process achievement storage section 56, the display 63, and the work type acquisition section 64.

The formulating function for the updated process plan includes the process plan storage section 51, the process achievement storage section 56, the initial process plan acquisition section 61, and the process plan update section 62. The next work instructing function for the worker includes the process plan storage section 51, the machine state acquisition section 52, the performing worker acquisition section 53, the position information acquisition section 54, the work state acquisition section 55, the capacity database 57, the next work candidate extraction section 58, the all workers' states acquisition section 59, and the next work determination section 60.

The constructing function for the workers' capacity database includes the capacity database 57, the position information acquisition section 54, the work type acquisition section 64, the machine image information acquisition section 71, the view information acquisition section 72, the biological information acquisition section 73, the acceleration information acquisition section 74, the operation order information acquisition section 75, and the database update section 76.

The formulating function for the updated process plan (corresponding to a process plan formulation device of the disclosure) includes the process plan storage section 51, the process achievement storage section 56, the initial process plan acquisition section 61, the performing worker acquisition section 53, the work state acquisition section 55, the work type acquisition section 64, the capacity database 57, and the process plan update section 62.

Figure 5:
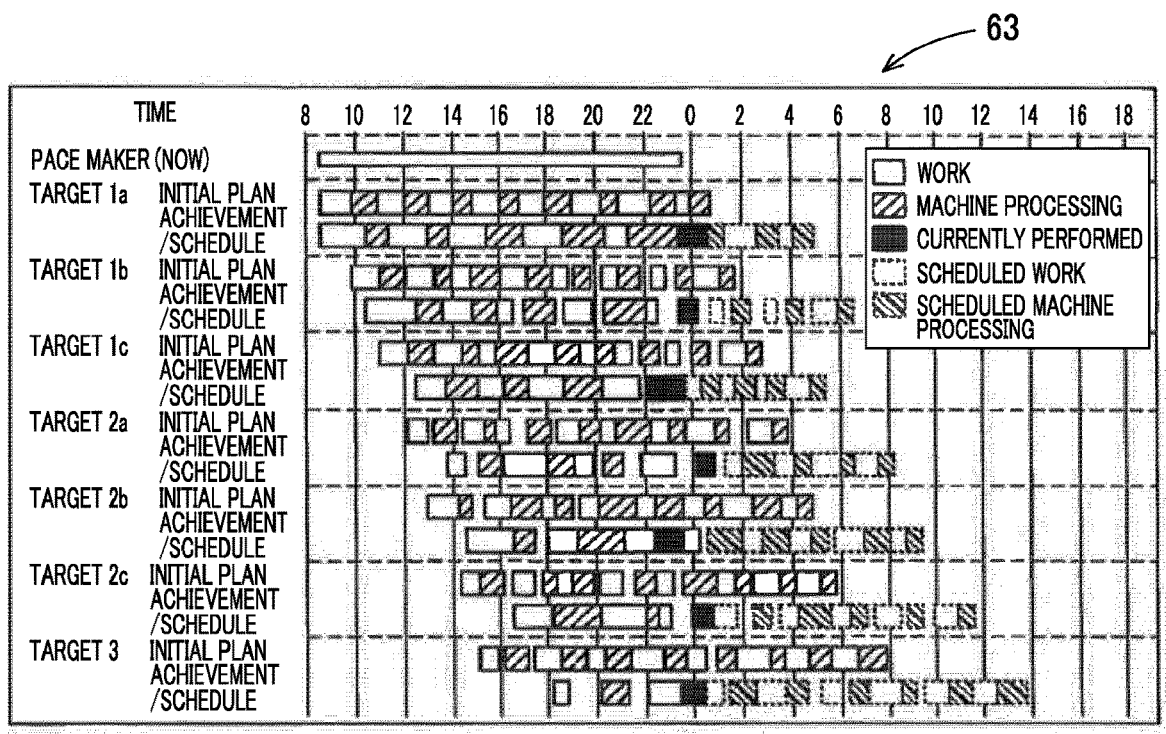
FIG. 5 shows what is displayed on a display in FIG. 4, and an initial process plan, process achievement, and an updated process plan (a schedule plan) are displayed thereon.

Next, referring to FIG. 4 and FIG. 5, a description will be provided on the operation achievement determining function of the management device M. First, referring to FIG. 5, a description will be provided on an initial process plan, process achievement, and the updated process plan that are used for the operation achievement determining function.

FIG. 5 shows contents displayed on the display 63. In FIG. 5, a pace maker indicative of current time, the initial process plan per target that is stored in the process plan storage section 51, the updated process plan per target that is stored in the process plan storage section 51, and the process achievement per target that is stored in the process achievement storage section 56 are displayed. Targets 1a, 1b, 1c are targets of the same type, and targets 2a, 2b, 2c are targets of the same type. Here, the target is a production target (a workpiece, an assembled article, and the like) in the production facility and is a logistic target (a transported article) in the logistic facility. The targets 1a, 1b, 1c, the targets 2a, 2b, 2c, and a target 3 are targets of different types.

Here, the process plan is a plan that defines a performing sequence regarding the processing performed by the plurality of processing machines MC1 to MC8 and the work performed on the plurality of processing machines MC1 to MC8 by the plurality of workers. The initial process plan and the updated process plan are stored in the process plan storage section 51. The initial process plan is determined in advance by a manager on the basis of a production plan for the target. Furthermore, the initial process plan is a process plan that is set on the basis of the work time required by the worker who has standard work capacity. The updated process plan is a process plan that is obtained by updating the initial process plan in accordance with the operation achievement accomplished by the processing machines and work achievement accomplished by the worker. The process achievement represents processing achievement accomplished by the processing machines MC1 to MC8 and the work achievement accomplished by the worker. The process achievement is stored in the process achievement storage section 56.

In FIG. 5, it is understood from the display on the pace maker that the current time is about 23:30. The initial process plan is displayed in an initial plan column per target in FIG. 5. In the initial plan column, a blank solid-line frame represents the work performed by the worker, and a hatched solid-line frame represents the processing performed by the processing machines MC1 to MC8.

The process achievement is represented by a blank solid-line frame and a hatched solid-line frame in an achievement/schedule column per target in FIG. 5. In the achievement/schedule column, the blank solid-line frame represents the work achievement accomplished by the worker, and the hatched solid-line frame represents the processing achievement accomplished by the processing machines MC1 to MC8. The updated process plan is represented by a blank broken-line frame and a hatched broken-line frame in the achievement/schedule column per target in FIG. 5. The blank broken-line frame represents scheduled work to be performed by the worker, and the hatched broken-line frame represents scheduled processing to be performed by the processing machines MC1 to MC8. Here, in FIG. 5, a black-painted frame represents the processing that is currently performed by the processing machines MC1 to MC8 or the work that is currently performed by the worker. In addition, a gap between the frames is a time slot during which the processing is not performed by the processing machines MC1 to MC8 and the work is not performed by the worker.

Here, the process achievement storage section 56 stores the processing achievement accomplished by the processing machines MC1 to MC8 and the work achievement accomplished by the worker. The processing achievement accomplished by the processing machines MC1 to MC8 is information obtained by the machine state acquisition section 52. The machine state acquisition section 52 obtains the current states (the operation states) of the processing machines MC1 to MC8 from the controllers 12 of the processing machines MC1 to MC8.

Meanwhile, the work achievement accomplished by the worker is information obtained by the work state acquisition section 55 and the work type acquisition section 64. The work state acquisition section 55 obtains information on the state of work performed by the worker as one type of the work achievement. Here, the information on the state of work performed by the worker is information on work start time, work finish time, and whether work is currently performed or in a finished state.

Furthermore, the work type acquisition section 64 obtains the type of work performed by the worker as another type of the work achievement. The work type acquisition section 64 obtains the next work that is determined by the next work determination section 60, which will be described below, and thereby obtains the work type. Note that processing performed by the work state acquisition section 55 and processing performed by the next work determination section 60 will be described in detail below.

Figure 6:
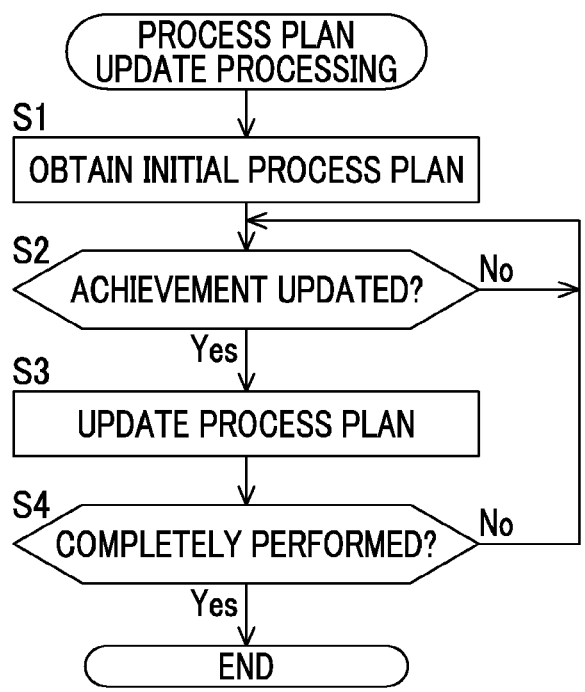
FIG. 6 is a flowchart of processing performed by a process plan update section in FIG. 4.

Next, referring to FIG. 4 to FIG. 6, a description will be provided on the formulating function for the updated process plan in the management device M. The formulating function for the updated process plan includes the process plan storage section 51, the process achievement storage section 56, the initial process plan acquisition section 61, and the process plan update section 62.

The initial process plan acquisition section 61 obtains the initial process plan that is stored in the process plan storage section 51. The process plan update section 62 formulates the updated process plan as represented by the broken-line frame in FIG. 5 on the basis of the initial process plan obtained by the initial process plan acquisition section 61 and the process achievement stored in the process achievement storage section 56.

Processing performed by the process plan update section 62 is shown in detail in FIG. 6. The update section 62 obtains the initial process plan from the initial process plan acquisition section 61 (S1). Next, the update section 62 determines whether the achievement stored in the process achievement storage section 56 has been updated (S2). If the achievement has not been updated, the update section 62 repeats determination processing until the achievement is updated (S2: No).

On the other hand, if the achievement has been updated, the update section 62 updates the process plan on the basis of the process achievement (S3). Next, the update section 62 determines whether the process plan has been completely performed. If not (S4: No), the processing returns to S2, and the processing is repeated. On the other hand, if the process plan has been completely performed (S4: Yes), the update section 62 terminates the processing.

In other words, when a delay occurs in the process achievement with respect to the initial process plan, the process plan update section 62 determines a future process plan in consideration of this delay. At this time, the work time required by the worker is set on the basis of the work time required by the worker who has the standard work capacity.

Figure 12:
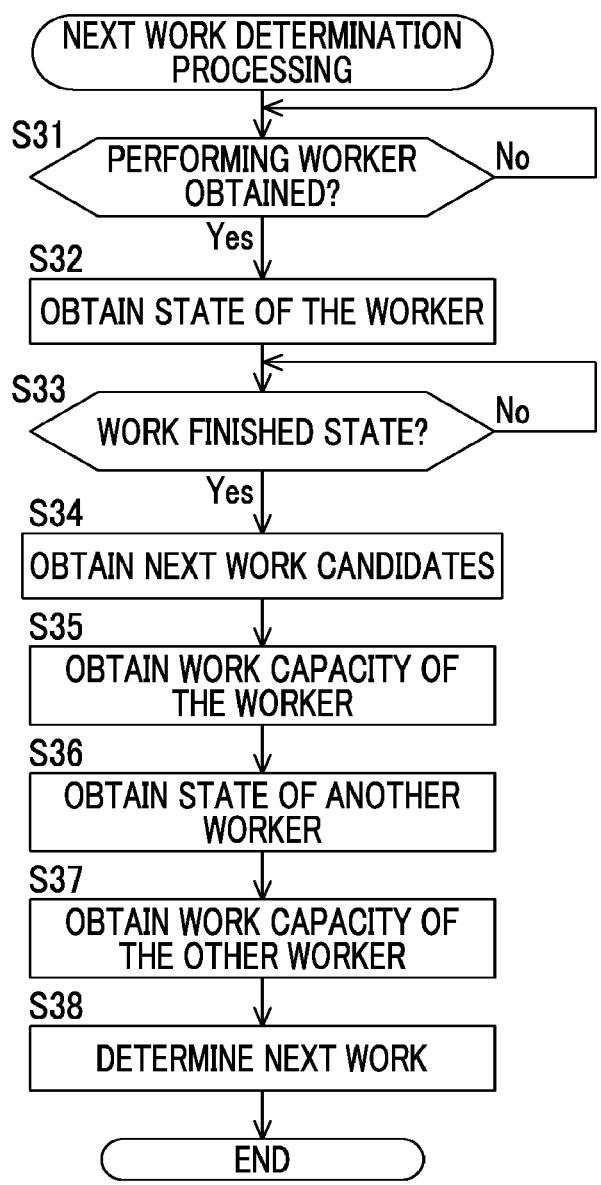
FIG. 12 is a flowchart of processing performed by a next work determination section in FIG. 4.

Next, referring to FIG. 4, FIG. 5, and FIG. 12, a further detailed description will be provided on the formulating function for the updated process plan in the management device M (corresponding to a process plan formulation device of the disclosure). The formulating function for the updated process plan includes the process plan storage section 51, the process achievement storage section 56, the initial process plan acquisition section 61, the performing worker acquisition section 53, the work state acquisition section 55, the work type acquisition section 64, the capacity database 57, and the process plan update section 62.

The initial process plan acquisition section 61 obtains the initial process plan that is stored in the process plan storage section 51. The process plan update section 62 formulates the updated process plan as represented by the broken-line frame in FIG. 5 as soon as possible on the basis of the initial process plan obtained by the initial process plan acquisition section 61, the process achievement stored in the process achievement storage section 56, the performing worker obtained by the performing worker acquisition section 53, the work state obtained by work state acquisition section 55, the work type obtained by the work type acquisition section 64, and the capacity database 57.

Figure 13:
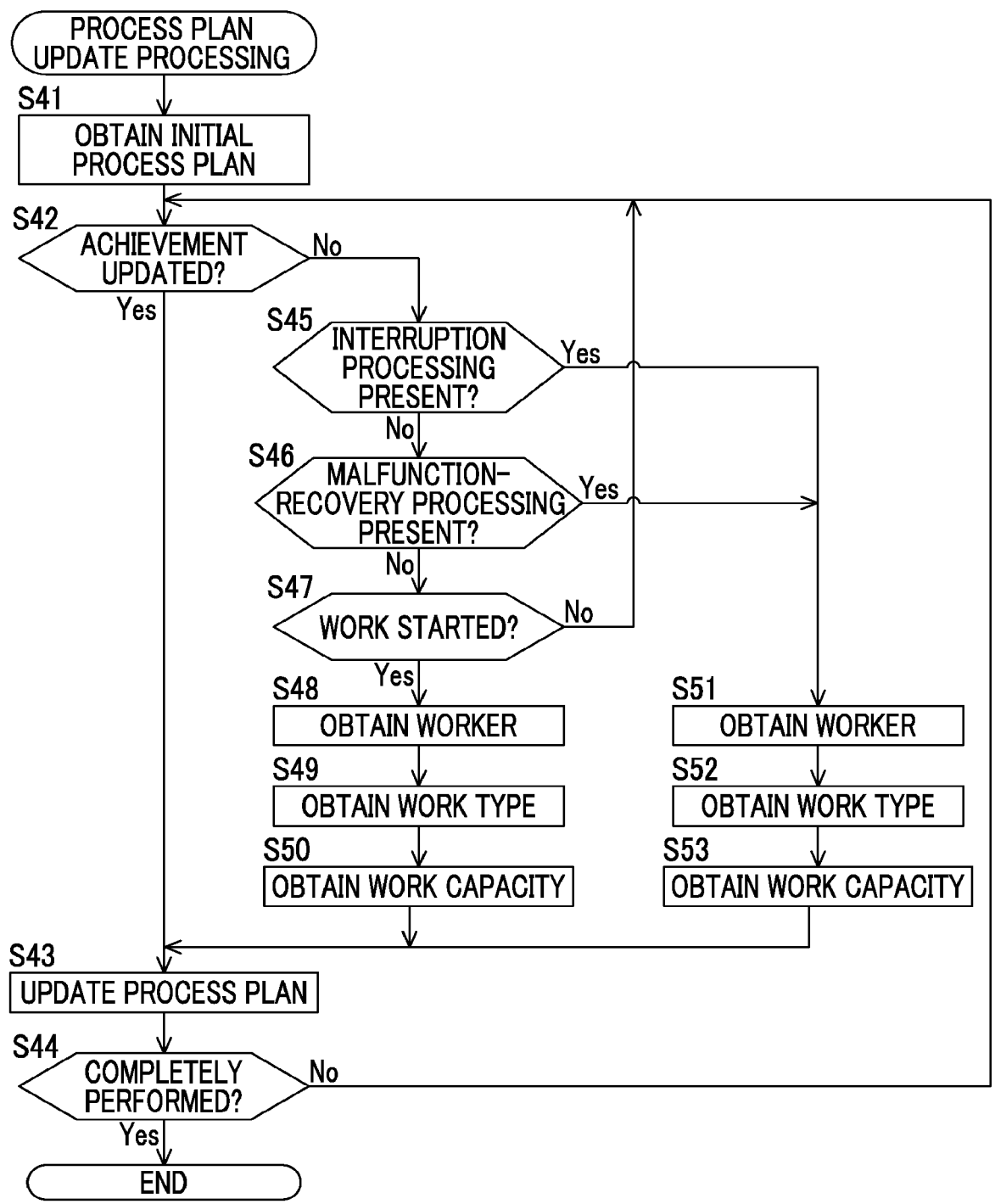
FIG. 13 is a flowchart of processing performed by the process plan update section in FIG. 4.

The processing by the process plan update section 62 is shown in detail in FIG. 13. The update section 62 obtains the initial process plan from the initial process plan acquisition section 61 (S41). Next, the update section 62 determines whether the achievement stored in the process achievement storage section 56 has been updated (S42). If the achievement has been updated (S42: Yes), the update section 62 updates the process plan on the basis of the process achievement (S43). Next, the update section 62 determines whether the process plan has been completely performed. If not (S44: No), the processing returns to S42, and the processing is repeated. On the other hand, if the process plan has been completely performed (S44: Yes), the update section 62 terminates the processing.

If the achievement has not been updated in S42 (S42: No), it is determined whether interruption processing that is not included in the initial process plan is present (S45). If the interruption processing is absent (S45: No), it is determined whether malfunction has occurred in any of the processing machines MC1 to MC8 and malfunction-recovery processing has thereby become necessary (S46). If the malfunction-recovery processing is not necessary (S46: No), normal processing is performed. In this case, the update section 62 determines whether a work start has been obtained by the work state acquisition section 55 (S47). If the work has not been started (S47: No), the processing returns to S42, and the update section 62 repeats the processing.

If the work has been started (S47: Yes), the update section 62 obtains the performing worker from the performing worker acquisition section 53 (S48), and obtains the type of work that is performed by the performing worker from the work type acquisition section 64 (S49). Next, the update section 62 obtains the work capacity of the performing worker from the capacity database 57 (S50).

Next, the process plan is updated (S43). In this case, with regard to the update of the process plan in S43, the finish time of the work is predicted by using the work time as the work capacity of the worker, and the process plan is thereby updated. That is, immediately after the worker starts the work, the process plan is updated by reflecting (i.e., by taking into account) the work time that is associated with the worker.

If the interruption processing is present in S45 (S45: Yes), the update section 62 obtains the worker who performs the work for the interruption processing (S51), obtains the work type of the interruption processing (S52), and obtains the work capacity of the worker (S53). Then, the process plan is updated (S43). In this case, with regard to the update of the process plan in S43, finish time of the interruption processing is predicted by using the interruption processing for the processing machines MC1 to MC8 and the work time as the work capacity of the worker who performs the work for the interruption processing, and the process plan is thereby updated. That is, immediately after the interruption processing is started, the process plan is updated by reflecting (i.e., by taking into account) processing time required for the interruption processing and the work time that is associated with the worker.

In addition, if the malfunction-recovery processing has become necessary in S46 (S46: Yes), the update section 62 obtains the worker who performs recovery work for the malfunction (S51), obtains the work type of the recovery work (S52), and obtains the work capacity of the worker (S53). Next, the process plan is updated (S43). In this case, with regard to the update of the process plan in S43, finish time of the recovery work is predicted by using the work time as the work capacity of the worker who performs the recovery work, and the process plan is thereby updated. That is, immediately after the recovery work for the malfunction is started, the process plan is updated by reflecting (i.e., by taking into account) the work time required for the recovery work for the malfunction.

The process plan formulating function of the management device M according to the above embodiment corresponds to the process plan formulation device for the facility 1 including the plurality of processing machines MC1 to MC8 configured to define the performing sequence regarding the processing performed by the plurality of processing machines MC1 to MC8 and the work on the plurality of processing machines MC1 to MC8 performed by the worker.

This process plan formulating function includes: the capacity database 57 that stores the work capacity of each of the plurality of workers with regard to each of the plurality of work types; the initial process plan acquisition section 61 that obtains the initial process plan set on the basis of the work time required by the worker who has the standard work capacity; the performing worker acquisition section 53 that obtains the worker who performs the work included in the initial process plan; and the process plan update section 62 that formulates the updated process plan by changing the initial process plan on the basis of the worker obtained from the performing worker acquisition section 53 and the work capacity of the worker.

Here, because the work capacity differs depending on each worker, time required for the same work also differs depending on each worker. Thus, according to the process plan formulating function of the management device M, the process plan update section 62 updates the process plan in real time in accordance with the work capacity of the worker who performs the work after the worker is determined. Thus, the process plan can be updated before the work is finished. Because the process plan can be updated at an early stage, the next work can be further efficiently performed.

The performing worker acquisition section 53 obtains the worker who performs the work for the interruption processing when the interruption processing that is not included in the initial process plan occurs. Then, when the interruption processing that is not included in the initial process plan occurs, the process plan update section 62 formulates the updated process plan by changing the initial process plan on the basis of the interruption processing for the processing machines MC1 to MC8 and the work capacity of the worker who performs the work for the interruption processing.

When the interruption processing occurs, the worker who performs the work for the interruption processing is determined. Thereafter, the process plan update section 62 updates the process plan in real time in accordance with the work capacity of the worker. Thus, the process plan can be updated before the work for the interruption processing is finished. Because the process plan can be updated at the early stage, the next work can be further efficiently performed.

In addition, when the malfunction occurs in any of the plurality of processing machines MC1 to MC8, the process plan update section 62 formulates the updated process plan by changing the initial process plan on the basis of the work capacity of the worker who performs the recovery work for the malfunction. That is, when the malfunction occurs in the processing machine, the worker who performs the recovery work for the malfunction is determined. Thereafter, the process plan update section 62 updates the process plan in real time in accordance with the work capacity of the worker. Thus, the process plan can be updated before the recovery work for the malfunction is finished. Because the process plan can be updated at the early stage, the next work can be further efficiently performed.

Next, referring to FIG. 7A and FIG. 7B, a description will be provided on the capacity database 57 that is used for the next work instructing function for the worker in the management device M. FIG. 7A shows a first example of the capacity database 57, and FIG. 7B shows a second example of the capacity database 57.

The capacity database 57 stores the work capacity of each of the plurality of workers with regard to each of the plurality of work types. The work types include, for example, set-up, test machining, malfunction-recovery processing, and the like. Furthermore, the information is stored for each of the processing machines MC1 to MC8.

As shown in FIG. 7A, the first example of the capacity database 57 has information on whether each of the workers can perform the work of each work type. In the drawing, a circle indicates that the work type can be performed, and a cross sign indicates that the work type cannot be performed. While a worker A can perform all of the work types, workers B, C, D can perform only some of the work types. Furthermore, the first example of the capacity database 57 has the work time required by each of the workers when the worker can perform the corresponding work type. This work time is the shortest work time in the past achievement, latest average work time, or the like.

As shown in FIG. 7B, the second example of the capacity database 57 has information on whether each of the workers can perform the work of each work type, and also has a proficiency level when each of the workers can perform the corresponding work type. For example, when each of the workers can perform the corresponding work type, the second example of the capacity database 57 indicates whether each of the workers has the capacity that is equal to or higher than standard capacity or does not have the standard capacity as the proficiency level. In the drawing, the circle indicates that the worker has the capacity that is equal to or higher than the standard capacity, a triangle sign indicates that the worker does not have the standard capacity, and the cross sign indicates that the worker cannot perform the work of the work type. Furthermore, the second example of the capacity database 57 has the work time required by each of the workers when the each of the workers can perform the corresponding work type. This work time is the shortest work time in the past achievement, the latest average work time, or the like.

Moreover, the capacity database 57 has work achievement information shown in FIG. 8. The work achievement information includes, per worker and per work type, the work time, machine work time, the position information, the biological information, the acceleration information, the view information captured by the mobile imager 34, the information captured by the machine imager 14, and operation procedure information. The work time is duration of time from start to finish of the work with the home position P being used as a reference. The machine work time is duration of time when the work is directly performed on any of the processing machines MC1 to MC8. The machine work time can be computed from the operation on the operation panel 13, the position information, machine imaging information, the view information, the acceleration information, and the like. The operation procedure information is information on an operation procedure for the operation panel 13 performed by the worker.

As described above, the capacity database 57 has many types of the work achievement information. Construction processing thereof is performed by the database update section 76. More specifically, the database update section 76 updates the capacity database 57 by obtaining the information from the position information acquisition section 54, the work type acquisition section 64, the machine image information acquisition section 71, the view information acquisition section 72, the biological information acquisition section 73, the acceleration information acquisition section 74, and the operation order information acquisition section 75. Here, when the work is performed a plurality of times on the same target, the latest information is stored.

Referring to FIG. 3A, FIG. 3B, FIG. 9, and FIG. 10, a description will be provided on processing performed by the work state acquisition section 55 that is used for the next work instructing function for the worker and the operation achievement determining function performed by the management device M. The work state acquisition section 55 includes a work start time estimation section 55a and a work finish time estimation section 55b.

Figure 9:
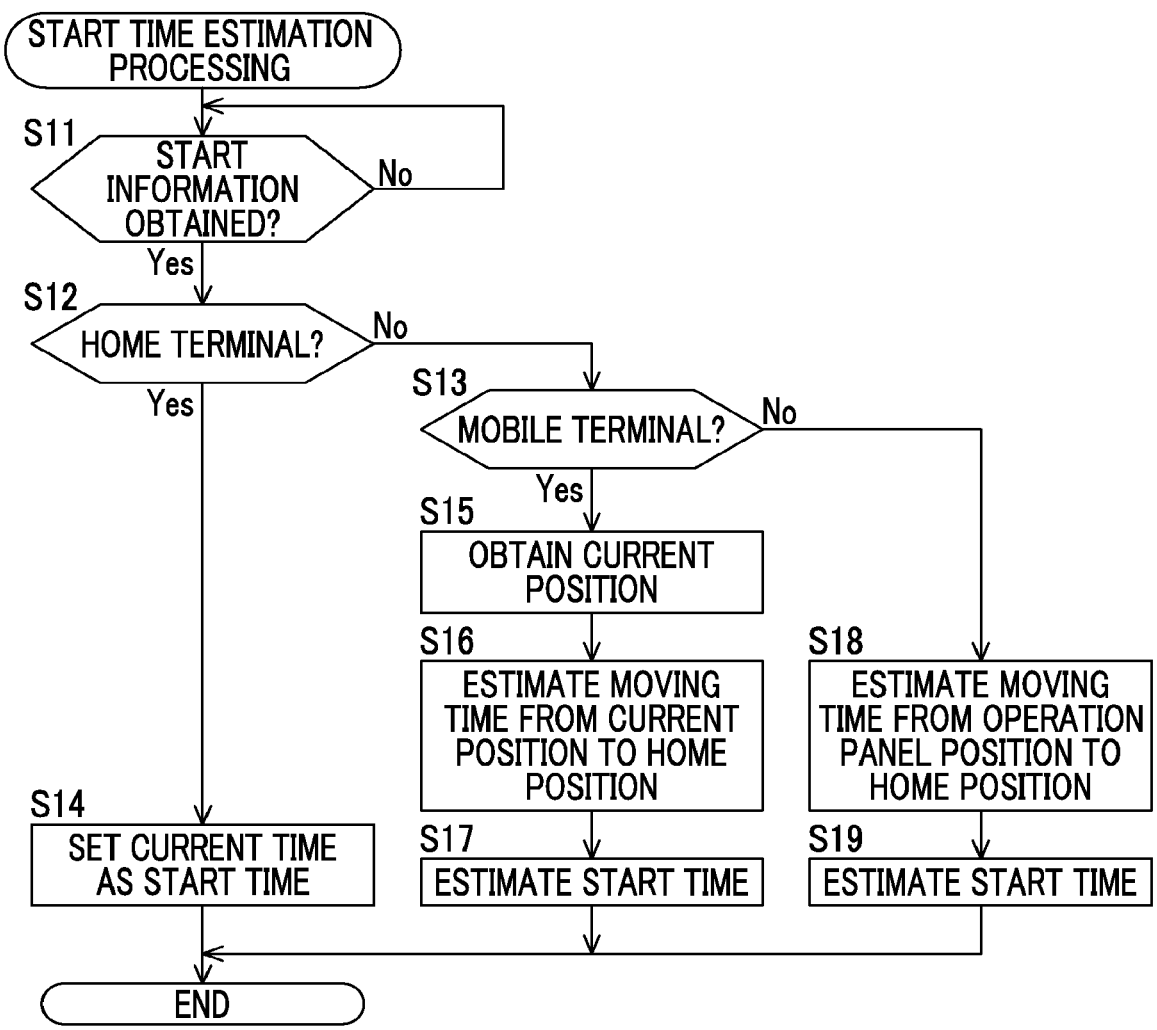
FIG. 9 is a flowchart of processing performed by a work start time estimation section in a work state acquisition section in FIG. 4.

As shown in FIG. 9, the work start time estimation section 55a determines whether the start information has been obtained by any of the worker terminals 13, HP, W (S11). That is, the estimation section 55a determines whether the worker has touched the start button shown in FIG. 3A of any of the worker terminals 13, HP, W. If the start information has been obtained, the estimation section 55a determines whether the operated worker terminal is the home terminal HP (S12) and determines whether the operated worker terminal is the mobile terminal W (S13) if it is not the home terminal HP.

If the worker has operated the home terminal HP (S12: Yes), the estimation section 55a sets the current time at which the start button is touched, as the start time (S14). If the worker has operated the mobile terminal W (S12: No→S13: Yes), the estimation section 55a obtains the position information of the mobile terminal W that is obtained by the position information acquisition section 54 (S15). Next, the estimation section 55a estimates a moving time of the worker on the basis of a standard moving speed of the worker and a distance from the current position of the mobile terminal W to the home position P (S16). The standard moving speed of the worker is set in advance. Next, the estimation section 55a estimates time that is obtained by adding the estimated moving time to the current time, as the start time (S17).

If the worker has operated the operation panel 13 (S12: No→S13: No), the estimation section 55a estimates the moving time of the worker on the basis of the standard moving speed of the worker and a distance from a position of the operated operation panel 13 to the home position P (S18). Then, the estimation section 55*a* estimates time that is obtained by adding the estimated moving time to the current time, as the start time (S19).

Figure 10:
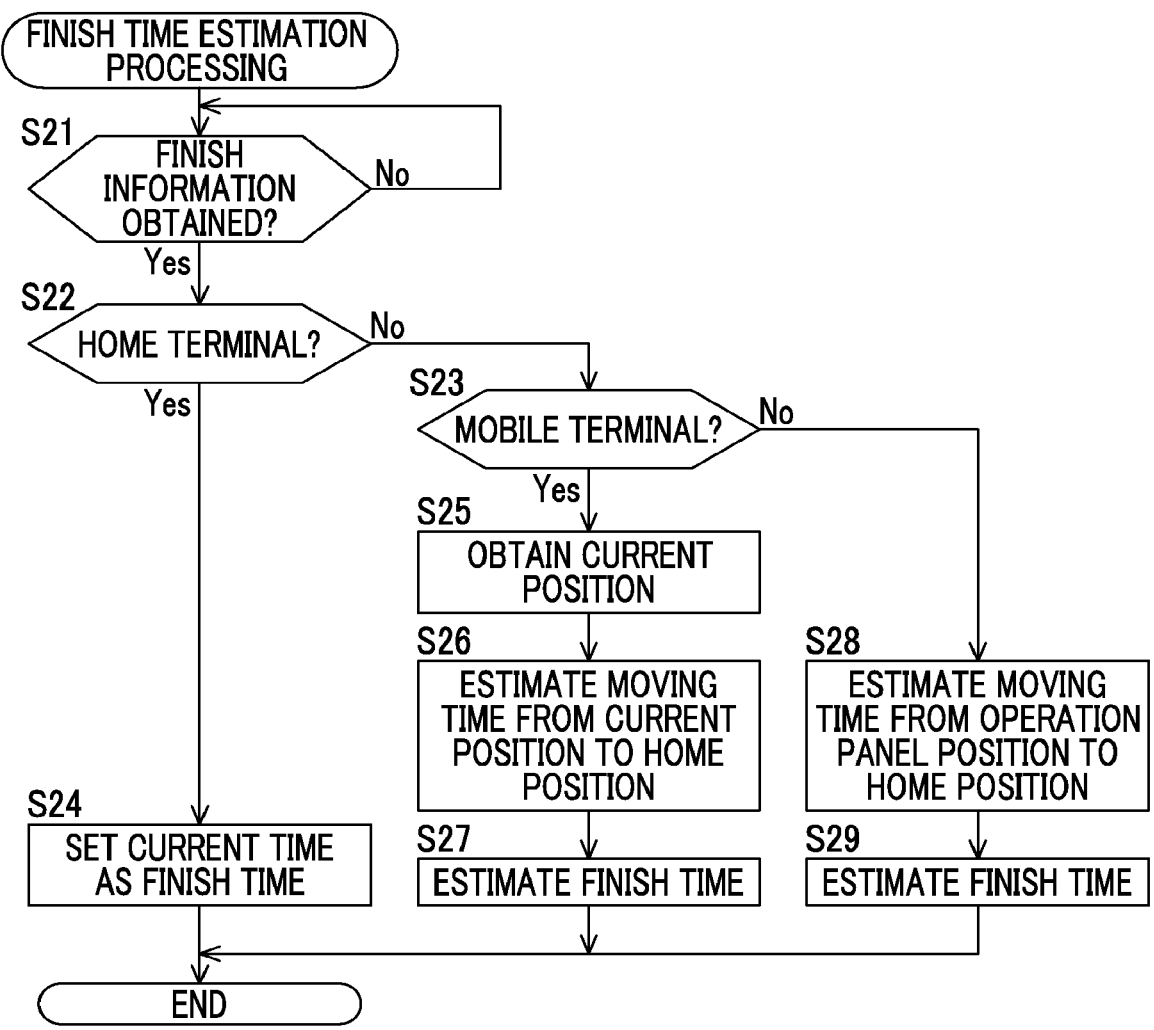
FIG. 10 is a flowchart of processing performed by a work finish time estimation section in the work state acquisition section in FIG. 4.

As shown in FIG. 10, the work finish time estimation section 55*b* determines whether the finish information has been obtained by any of the worker terminals 13, HP, W (S21). That is, the estimation section 55*b* determines whether the worker has touched the finish button shown in FIG. 3B of any of the worker terminals 13, HP, W. If the finish information has been obtained, the estimation section 55*b* determines whether the operated worker terminal is the home terminal HP (S22), and determines whether the operated worker terminal is the mobile terminal W (S23) if it is not the home terminal HP.

If the worker has operated the home terminal HP (S22: Yes), the estimation section 55*b* sets the current time at which the finish button is touched, as the finish time (S24). If the worker has operated the mobile terminal W (S22: No→S23: Yes), the estimation section 55*b* obtains the position information on the mobile terminal W that is obtained by the position information acquisition section 54 (S25). Next, the estimation section 55*b* estimates the moving time of the worker on the basis of the standard moving speed of the worker and a distance from the current position of the mobile terminal W to the home position P (S26). Then, the estimation section 55*b* estimates time that is obtained by adding the estimated moving time to the current time as the finish time (S27).

If the worker has operated the operation panel 13 (S22: No→S23: No), the estimation section 55*b* estimates the moving time of the worker on the basis of the standard moving speed of the worker and the distance from the position of the operated operation panel 13 to the home position P (S28). Then, the estimation section 55*b* estimates time that is obtained by adding the estimated moving time to the current time, as the finish time (S29).

Referring to FIG. 11, a description will be provided on processing performed by the all workers' states acquisition section 59 that is used for the next work instructing function for the worker performed by the management device M. The all workers' states acquisition section 59 receives: information on the performing worker obtained by the performing worker acquisition section 53; and information on the work state obtained by the work state acquisition section 55. In detail, as shown in FIG. 11, the all workers' states acquisition section 59 has input time at which the work start information is input, work start estimated time (i.e., estimated work start time) with the home position P being used as the reference (also referred to as HP work start estimated time), input time at which the work finish information is input, and work finish estimated time (i.e., estimated work finish time) with the home position P being used as the reference (also referred to as HP work finish estimated time) for each of the workers.

Furthermore, the all workers' states acquisition section 59 has information on whether the worker is currently working or in the work finished state. If the worker has not finished the work after starting the work, the all workers' states acquisition section 59 determines that the worker is currently working. If the worker has not started the work after finishing the work, the all workers' states acquisition section 59 determines that the worker is in the work finished state.

Furthermore, the all workers' states acquisition section 59 has predicted time at which the currently performing worker finishes the indicated work. At this time, the all workers' states acquisition section 59 obtains the work type that is indicated to the worker by the next work determination section 60, and thereby computes the predicted time in consideration of the standard work time that is associated with the work type.

Here, in FIG. 11, the worker A is currently working, and the work start input time is the same as the HP work start estimated time. That is, the worker A uses the home terminal HP to perform a work start operation. Similarly, the worker C also uses the home terminal HP to perform a work finish operation. Meanwhile, the work start input time of the worker D differs from the HP work start estimated time. That is, the worker D uses the mobile terminal W or the operation panel 13 to perform the work start operation. The same applies to the worker B.

Next, referring to FIG. 3A, FIG. 4, and FIG. 12, a description will be provided on the next work instructing function for the worker, which is performed by the management device M. The next work instructing function for the worker includes the process plan storage section 51, the machine state acquisition section 52, the performing worker acquisition section 53, the position information acquisition section 54, the work state acquisition section 55, the capacity database 57, the next work candidate extraction section 58, the all workers' states acquisition section 59, and the next work determination section 60.

As shown in FIG. 4, the next work candidate extraction section 58 obtains the current states of the plurality of processing machines MC1 to MC8 obtained by the machine state acquisition section 52 and the process plan stored in the process plan storage section 51. Then, the next work candidate extraction section 58 extracts the next work candidates for the workers, on the basis of the current states of the processing machines MC1 to MC8 and the process plan. The next work candidates are the work in the entire facility 1 that currently needs to be performed by the workers. These next work candidates are displayed in the candidate column 42 of each of the worker terminals 13, HP, W in FIG. 3A. When extracting the plurality of next work candidates, the next work candidate extraction section 58 determines an order (priority order) of the plurality of next work candidates. The order is also displayed in the candidate column 42 in FIG. 3A.

Next, the next work determination section 60 determines the next work for a specified worker. Referring to FIG. 12, a description will be provided on processing performed by the next work determination section 60. The determination section 60 determines whether the performing worker is obtained by the performing worker acquisition section 53 (S31). That is, when any of the workers touches the worker button on any of the worker terminals 13, HP, W, the determination section 60 determines that the performing worker is obtained.

The processing does not proceed unless the determination section 60 obtains the performing worker (S31: No). On the other hand, if the determination section 60 obtains the performing worker (S31: Yes), the determination section 60 obtains the state of the performing worker from the all workers' states acquisition section 59 (S32). Then, the determination section 60 determines whether the state of the performing worker is the work finished state (S33). If the worker is not in the work finished state (S33: No), the processing returns to S33, and the determination section 60 repeats the processing.

On the other hand, if the performing worker is in the work finished state (S33: Yes), the determination section 60 obtains the next work candidates that are extracted by the next work candidate extraction section 58 (S34). Next, the determination section 60 obtains the work capacity of the performing worker from the capacity database 57 (S35). Then, the determination section 60 obtains the state of another worker from the all workers' states acquisition section 59 (S36). For example, the determination section 60 obtains information as to, for example, whether the other worker is currently able to start a next work, and whether the other worker is about to finish the work soon. Next, the determination section 60 obtains the work capacity of the other worker from the capacity database 57 (S37).

Finally, the determination section 60 determines the next work for the performing worker on the basis of the next work candidates, the work capacity of the performing worker, the state of the other worker, and the work capacity of the other worker (S38). The determination section 60 determines whether the performing worker can perform the next work candidate with high priority (the highest priority). If the performing worker can perform the next work candidate, the determination section 60 determines the next work candidate that can be performed by the performing worker, as the next work for the performing worker. Note that, if the other worker can also start working, the determination section 60 determines the next work for the performing worker in consideration of the work capacity of the performing worker and the work capacity of the other worker.

For example, as shown in FIG. 7A, while the worker A can perform the work of all the work types, the workers B, C, D can perform only the work of some of the work types. The following case is assumed. When the next work for the worker A is determined, the worker B is currently able to start a next work, or the worker B will be able to start a next work soon. At this time, in the case where the work type that can be performed by both of the worker A and the worker B is the next work candidate with the high priority, the determination section 60 determines the next work candidate with low priority (lower priority than the highest priority) as the next work for the worker A. While the next work candidate with the high priority can be indicated as the next work for the worker B, the next work candidate with low priority may not be able to be indicated as the next work for the worker B. For this reason, the next work candidate with the high priority is determined as the next work for the worker B, and the next work candidate with low priority is determined as the next work for the worker A. In this way, the next work candidates can be efficiently performed.

Note that, when the next work candidate with low priority is determined as the next work, the process plan is taken into consideration. In the case where a delay may occur in the process plan when the next work candidate with low priority is determined as the next work for the worker, the next work candidate with low priority is not determined as the next work for the worker, and the next work candidate with the high priority is determined as the next work for the worker.

Meanwhile, when the delay does not occur in the process plan, the next work determination section 60 can determine the next work for the worker who has the lower work capacity than the standard capacity. In FIG. 5, the gap between the frames is the time slot during which the processing is not performed by the processing machines MC1 to MC8 and the work is not performed by the worker. That is, by using this blank time, the next work determination section 60 can extend the work time such that a margin is provided, that is, the work time is longer than standard work time. In this way, the worker with the low work capacity can be educated during this time.

The work instructing function (corresponding to the work instruction system) of the management device M according to the above embodiment is provided for the facility 1 that includes the plurality of processing machines MC1 to MC8, and the work instructing function provides each of the workers with the work instruction on any of the plurality of processing machines MC1 to MC8.

The work instructing function of the management device M includes: the process plan storage section 51 configured to store the process plan that defines the performing sequence regarding the processing performed by the plurality of processing machines MC1 to MC8 and the work on the plurality of processing machines MC1 to MC8 performed by the plurality of workers; the next work candidate extraction section 58 configured to extract the plurality of next work candidates for the plurality of workers on the basis of the current states of the plurality of processing machines MC1 to MC8 and the process plan; the capacity database 57 configured to store the work capacity of each of the plurality of workers with regard to each of the plurality of work types; and the next work determination section 60 configured to determine the next work for the specified worker from among the next work candidates, on the basis of the work capacity stored in the capacity database 57.

The process plan defines the performing sequence regarding the processing performed by the plurality of processing machines and the work on the plurality of processing machines performed by the plurality of workers. For example, in the process plan for the first processing machine MC1, the performing sequence is defined as, for example, work A performed by the worker→processing B performed by the first processing machine MC1→work C performed by the worker processing D performed by the first processing machine MC1. The same applies to the other processing machines MC2 to MC8. The facility 1 includes the plurality of processing machines MC1 to MC8. Thus, the process plan for the entire facility 1 is set such that the processing machines MC1 to MC8 perform processing in parallel and the workers perform work on the processing machines MC1 to MC8 in parallel.

Accordingly, with regard to the entire facility 1, for example, there is a case where the work A should be continuously performed, and there is also a case where the work A and the work C should be alternately performed. In addition, there is a case where the work A should be concurrently performed by a plurality of workers. Thus, the next work candidate extraction section 58 determines the next work candidates for the workers, for example, at a current time point. Then, the next work determination section 60 determines the next work for the specified worker from among the next work candidates.

Note that, when determining the next work, the next work determination section 60 takes the work capacity, which is stored in the capacity database 57, into consideration. The capacity database 57 stores the work capacity of each of the plurality of workers with regard to each of the plurality of work types. For example, there is a case where the plurality of workers can perform the work A while only the particular worker can perform the work C. Such information is stored in the capacity database 57.

That is, the next work determination section 60 determines the next work for the specified worker from among the next work candidates in accordance with the work capacity of the worker. For example, in the case where the work A, which can be performed by the specified worker, and the work C, which cannot be performed by the specified worker, are the work that should be performed currently, the next work determination section 60 can instruct the specified worker to perform the work A and instruct the other worker to perform the work C. Thus, when the specified worker is brought to a state in which the specified worker is able to start a next work, the specified worker is instructed to perform the work that can be performed by the specified worker.

In addition, the next work determination section 60 determines the next work for the performing worker (the specified worker) on the basis of the work capacity of the performing worker (the specified worker) and the work capacity of the other worker who can perform the work on the facility 1.

Depending on the work type, there are cases where all the workers can perform the work of the work type and where only some of the workers can perform the work of the work type. For example, the following case is assumed. While the performing worker can perform work of all the work types, the other worker can perform only the work of some of the work types. When a plurality of next work candidates are determined as the next work candidates, the work that cannot be performed by the other worker is determined as the next work for the performing worker. Thus, the next work for the performing worker is determined in consideration of the work capacity of the performing worker and the work capacity of the other worker. In this way, an appropriate instruction is provided to each of the workers.

The next work candidate extraction section 58 extracts the plurality of next work candidates and determines the priority order of the plurality of next work candidates. Furthermore, the next work determination section 60 determines the next work candidate with low priority as the next work for the performing worker, from among the plurality of next work candidates, on the basis of the work capacity of the performing worker and the work capacity of the other worker.

When the plurality of next work candidates are determined, the next work candidate extraction section 58 determines the priority order of the plurality of next work candidates. In this case, in general, the worker performs the next work according to this order. However, in consideration of the work capacity of the other worker, the particular work with low priority is determined as the next work for the performing worker. For example, in the cases where the work that can be performed by only the performing worker is included in the next work candidates and the work has low priority, the work is determined as the next work for the performing worker. In this way, the work can be performed in accordance with the process plan.

The next work determination section 60 determines the next work candidate with low priority as the next work for the performing worker from among the plurality of next work candidates on the basis of the work capacity of the performing worker, the work capacity of the other worker, and the process plan.

When the next work candidate with low priority is determined as the next work for the performing worker, the process plan is taken into consideration. In the case where the next work candidate with the high priority is the work that can be performed by the other worker and the next work candidate with low priority is the work that can be performed by only the performing worker, a delay may occur in the process plan when the performing worker performs the next work candidate with low priority. In this case, the performing worker performs the next work candidate that can also be performed by the other worker. In this way, the work can be reliably performed in accordance with the process plan.

The next work determination section 60 determines the next work candidate with low priority as the next work for the performing worker from among the plurality of next work candidates on the basis of the work capacity of the performing worker, the work capacity of the other worker, the process plan, and the current state of the other worker.

When the other worker is currently working, the next work for the performing worker is determined, taking into account whether the other worker has just started the work or some time has elapsed since the work was started. For example, when the other worker is about to finish the current work, the other worker performs the next work candidate with the high priority, and the performing worker performs the next work candidate with low priority. On the other hand, when it takes the other worker some time to finish the current work, the performing worker performs the next work candidate with the high priority. In this way, the work can be reliably performed in accordance with the process plan.

The management device M includes the work state acquisition section 55 that obtains the start information and the finish information on the work performed by each of the workers. Then, the next work determination section 60 determines, from among the next work candidates, the next work for the worker whose work finish information is obtained by the work state acquisition section 55, as the performing worker.

The work instructing function of the management device M determines whether the worker is currently able to start a next work on the basis of the work finish information. That is, the worker, whose work finish information is obtained, is instructed to perform the next work. In this way, the specified worker can reliably perform the next work.

The capacity database 57 includes information as to whether each of the workers has ability to perform the work of each of the work types, as the work capacity of each of the workers with regard to each of the work types. The next work determination section 60 can reliably determine the next work for the performing worker from among the next work candidates.

The capacity database 57 may further include the proficiency level when a worker has ability to perform work of a work type, as the work capacity of each of the workers with regard to each of the work types. The next work for the performing worker can be determined from among the next work candidates in consideration of the proficiency level of the worker. In this way, the work can be performed in accordance with the process plan.

The process plan storage section 51 stores the process plan obtained by updating the initial process plan, which is set in advance, in accordance with the states of the plurality of processing machines MC1 to MC8 and the work achievement accomplished by the worker. By successively updating the process plan in accordance with a situation, the further effective next plan can be determined.

The next work determination section 60 may determine the next work for the worker who has the lower work capacity than the standard capacity within a range where a delay does not occur in the process plan. When a specified work type is determined as the next work for the worker who has the lower work capacity than the standard capacity, the finish time of the work type may be delayed from the finish time in a case where the work type is determined as the next work for the other worker. However, when the delay falls within a range where a delay does not occur in the process plan (for example, within wait time for the next process), the worker with lower work capacity is instructed to perform the work of the specified work type for an educational purpose. In this way, it is possible to aim to improve the proficiency of the worker.

A capacity database constructing function (corresponding to a capacity database construction device) of the management device M according to the above embodiment is a device which is provided for the facility 1 including the plurality of processing machines MC1 to MC8, and which constructs the database of the work capacity of each of the workers who perform the work on the plurality of processing machines MC1 to MC8. The capacity database constructing function includes the work state acquisition section 55 that obtains the start time and the finish time of the work performed by the worker based on the assumption that the work is started and finished at the home position P in the facility 1; the work type acquisition section 64 that obtains the work type performed by the worker; the capacity database 57 that stores the work time for each work type as the work capacity; and the database update section 76 that updates the information in the capacity database 57 on the basis of the information obtained by the work state acquisition section 55 and the information obtained by the work type acquisition section 64.

With the above capacity database constructing function, the work state acquisition section 55 obtains the start time and the finish time of the work performed by the worker with the home position P being used as the reference. Accordingly, regardless of a position of the worker in the facility 1, the work time is determined by using the home position P as the reference. Thus, the work capacity that is stored in the capacity database 57 can be a result of fair evaluation of the work capacity of the worker.

The capacity database constructing function of the management device M includes the home terminal HP which is disposed at the home position P and to which the start and the finish of the work are input by the worker. The work state acquisition section 55 obtains the time at which the start of the work is input to the home terminal HP as the start time, and obtains the time at which the finish of the work is input to the home terminal HP as the finish time. When the start and the finish of the work performed by the worker are input using the home terminal HP disposed at the home position P, the work state acquisition section 55 can easily obtain the start time and the finish time of the work with the home position P being used as the reference.

The capacity database constructing function of the management device M includes the mobile terminals W which can be carried by the worker at the different position from the home position P and to which the start and the finish of the work are input by the worker. The work state acquisition section 55 includes the work start time estimation section 55a that estimates the start time on the basis of the input time and the distance from the position of the mobile terminal W to the home position P at the time of the input in the case where the start of the work is input to the mobile terminal W; and the work finish time estimation section 55b that estimates the finish time on the basis of the input time and the distance from the position of the mobile terminal W to the home position P at the time of the input in the case where the finish of the work is input to the mobile terminal W.

When the worker inputs the start and the finish of the work performed by the worker by using the mobile terminals W that can be carried by the worker, the work state acquisition section 55 estimates the start time and the finish time in consideration of the distance from the position of the mobile terminals W to the home position P. Accordingly, even when the worker at the different position from the home position P inputs the start and the finish of the work by using the mobile terminals W, the work state acquisition section 55 can reliably obtain the start time and the finish time of the work with the home position P being used as the reference.

The capacity database constructing function of the management device M includes the position information acquisition section 54 that obtains the position of the mobile terminal W. The work state acquisition section 55 estimates the start time and the finish time on the basis of the position that is obtained by the position information acquisition section 54. The position information acquisition section 54 obtains the position of the mobile terminals W. Accordingly, the work state acquisition section 55 can reliably obtain the start time and the finish time of the work with the home position P being used as the reference.

In addition, the capacity database constructing function of the management device M includes the input section 13a (corresponding to an operation panel input device) which is provided on the operation panel 13 for each of the plurality of processing machines MC1 to MC8 and to which the start and the finish of the work are input by the worker. The work state acquisition section 55 includes the work start time estimation section 55a that estimates the start time on the basis of the input time and the distance from the position of the input section 13a on the operation panel 13 to the home position P at the time of the input in the case where the start of the work is input to the input section 13a of the operation panel 13; and the work finish time estimation section 55b that estimates the finish time on the basis of the input time and the distance from the position of the input section 13a on the operation panel 13 to the home position P at the time of the input in the case where the finish of the work is input to the input section 13a of the operation panel 13.

When the worker inputs the start and the finish of the work performed by the worker by using the input section 13a that is provided on the operation panel 13 of each of the processing machines MC1 to MC8, the work state acquisition section 55 estimates the start time and the finish time in consideration of the distance from the position of the input section 13a on the operation panel 13 to the home position P. Accordingly, even in the cases where the worker is located at a position where the worker can operate the operation panel 13, and the worker inputs the start and the finish of the work to the input section 13a on the operation panel 13, the work state acquisition section 55 can reliably obtain the start time and the finish time of the work with the home position P being used as the reference.

The capacity database constructing function of the management device M includes the biological information acquisition section 73 for the worker. The database update section 76 updates the information in the capacity database 57 on the basis of the biological information obtained by the biological information acquisition section 73. The work time may vary due to a health condition of the worker. Accordingly, by obtaining the biological information, from which the health condition can be determined, the work capacity of the worker can be appropriately recorded.

The capacity database constructing function of the management device M includes the machine image information acquisition section 71 that obtains the information imaged by the machine imager 14 provided in each of the processing machines MC1 to MC8. The database update section 76 updates the information in the capacity database 57 on the basis of the information on the motion of the worker that is obtained by the machine image information acquisition section 71.

The machine imager 14 can record the work that is performed on any of the processing machines MC1 to MC8 by the worker. That is, a time period during which the worker is located near any of the processing machines MC1 to MC8 can be determined. The procedure of the work performed by the worker in the vicinity of any of the processing machines MC1 to MC8 can be determined. In addition, facial expression, the health condition, and the like of the worker can be determined. In other words, the information recorded by the machine imager 14 is stored in the capacity database 57. In this way, the work capacity of the worker can be appropriately recorded.

The capacity database constructing function of the management device M includes the operation order information acquisition section 75 that obtains the operation order information (i.e., information on the order (sequence) of the operation) on the operation panel 13 in each of the processing machines MC1 to MC8. The database update section 76 updates the information in the capacity database 57 on the basis of the operation order information regarding the worker that is obtained by the operation order information acquisition section 75. It is considered that there is an efficient operation order (sequence) for the input section 13*a* on the operation panel 13. Accordingly, by obtaining the operation order information, the work capacity of the worker can be appropriately recorded.

The capacity database constructing function of the management device M includes the view information acquisition section 72 that obtains the view information imaged by the mobile imager 34 carried by the worker. The database update section 76 updates the information in the capacity database 57 on the basis of the view information on the worker that is imaged by the view information acquisition section 72. From the view information on the worker, it can be determined how the worker has moved. That is, by obtaining the view information on the worker, it can be determined whether the motion of the worker is an efficient motion. As a result, the work capacity of the worker can be appropriately recorded.

What is claimed is:

1. A work instruction system for a facility including a plurality of processing machines, the work instruction system configured to provide work instructions on the plurality of processing machines to a plurality of workers, the work instruction system comprising:
   a process plan storage section configured to store a process plan that defines a performing sequence regarding processing performed by the plurality of processing machines and work on the plurality of processing machines performed by the plurality of workers;
   a machine state acquisition section configured to obtain current operation states of each of the plurality of processing machines in the facility directly from controllers of the plurality of processing machines in the facility;
   a next work candidate extraction section configured to extract a plurality of next work candidates for the plurality of workers based on the current operation states of the plurality of processing machines directly obtained from the controllers of the plurality of processing machines and the process plan;
   a capacity database configured to store work capacity of each of the plurality of workers with regard to each of a plurality of work types, the work capacity indicating a skill level of a respective worker for a respective work type;
   an operation terminal disposed within the facility and including an input section and a display section; and
   a next work determination section configured to determine next work on a processing machine from the plurality of processing machines for a specified worker from among the plurality of next work candidates based on the work capacity stored in the capacity database, wherein
   the operation terminal is configured to present the next work for the specified worker to the specified worker using the display section when the specified worker operates the input section,
   the process plan is updated to predict a schedule for completion of a production target based on (i) processing performed by the processing machine from the plurality of processing machines on the production target and (ii) a predicted completion of the next work by the specified worker based on the skill level indicated by the work capacity of the specified worker, and
   the skill level indicated by the work capacity of the specified worker is updated in the capacity database based on an amount of time required for the worker to complete the next work on the machine from the plurality of machines.

2. The work instruction system according to claim 1, wherein the next work determination section is configured to determine the next work for the specified worker based on work capacity of the specified worker and work capacity of another worker who is able to perform the next work in the facility.

3. The work instruction system according to claim 2, wherein
   the next work candidate extraction section is configured to extract the plurality of next work candidates and to determine a priority order of the plurality of next work candidates, and
   the next work determination section is configured to determine a next work candidate with low priority as the next work for the specified worker from among the plurality of next work candidates based on the work capacity of the specified worker and the work capacity of the another worker.

4. The work instruction system according to claim 3, wherein the next work determination section is configured to determine the next work candidate with the low priority as the next work for the specified worker from among the plurality of next work candidates based on the work capacity of the specified worker, the work capacity of the another worker, and the process plan.

5. The work instruction system according to claim 4, wherein the next work determination section is configured to determine the next work candidate with the low priority as the next work for the specified worker from among the plurality of next work candidates based on the work capacity of the specified worker, the work capacity of the another worker, the process plan, and a current state of the another worker.

6. The work instruction system according claim 1, wherein:
   the work instruction system includes a work state acquisition section configured to obtain start information and finish information on the work performed by each of the plurality of workers; and
   the next work determination section is configured to determine, from among the plurality of next work candidates, the next work for a worker whose work finish information is obtained by the work state acquisition section.

7. The work instruction system according to claim 1, wherein the skill level of each worker for each work type is based on information as to whether each of the plurality of workers has an ability to perform work of each of the plurality of work types.

8. The work instruction system according to claim 7, wherein the skill level of each worker for each work type is further based on a proficiency level designated for each worker among the plurality of workers that has the ability to perform the work of a work type among the plurality of work types.

9. The work instruction system according to claim 1, wherein the process plan storage section is configured to store the process plan that is obtained by updating an initial process plan that is set in advance in accordance with states of the plurality of processing machines and work achievements accomplished by the plurality of workers.

10. The work instruction system according to claim 1, wherein the next work determination section is configured to determine the next work for a worker who has lower work capacity than standard capacity within a range where a delay does not occur in the process plan.

11. The work instruction system according to claim 1, wherein the plurality of processing machines includes a machine tool and a robot.

12. The work instruction system according to claim 1, wherein the plurality of processing machines includes a lathe and a grinder.

13. The work instruction system according to claim 1, wherein, for the specified worker, the capacity database correspondingly stores at least one of position information, biological information, acceleration information, imaging information of the specified worker, and imaging information of a processing machine.

14. The work instruction system according to claim 1, wherein, for the specified worker, the capacity database correspondingly stores each of position information, biological information, acceleration information, imaging information of the specified worker, and imaging information of a processing machine.

15. The work instruction system according to claim 1, wherein the capacity database stores at least one of position information, biological information, acceleration information, imaging information of the specified worker, and imaging information of a processing machine for each of the plurality of workers.

16. The work instruction system according to claim 1, wherein the capacity database stores each of position information, biological information, acceleration information, imaging information of the specified worker, and imaging information of a processing machine for each of the plurality of workers.

17. A facility comprising:
a plurality of processing machines, and
a work instruction system configured to provide work instructions on the plurality of processing machines to a plurality of workers, wherein
the work instruction system includes:
a process plan storage section configured to store a process plan that defines a performing sequence regarding processing performed by the plurality of processing machines and work on the plurality of processing machines performed by the plurality of workers;
a machine state acquisition section configured to obtain current operation states of each of the plurality of processing machines in the facility directly from controllers of the plurality of processing machines in the facility;
a next work candidate extraction section configured to extract a plurality of next work candidates for the plurality of workers based on the current operation states of the plurality of processing machines directly obtained from the controllers of the plurality of processing machines and the process plan;
a capacity database configured to store work capacity of each of the plurality of workers with regard to each of a plurality of work types, the work capacity indicating a skill level of a respective worker for a respective work type;
an operation terminal including an input section and a display section; and
a next work determination section configured to determine next work on a processing machine from the plurality of processing machines for a specified worker from among the plurality of next work candidates based on the work capacity stored in the capacity database, wherein
the operation terminal is configured to present the next work for the specified worker to the specified worker using the display section when the specified worker operates the input section,
the process plan is updated to predict a schedule for completion of a production target based on (i) processing performed by the processing machine from the plurality of processing machines on the production target and (ii) a predicted completion of the next work by the specified worker based on the skill level indicated by the work capacity of the specified worker, and
the skill level indicated by the work capacity of the specified worker is updated in the capacity database based on an amount of time required for the worker to complete the next work on the machine from the plurality of machines.

18. The facility according to claim 17, wherein the plurality of processing machines includes a machine tool and a robot.

19. The facility according to claim 17, wherein the plurality of processing machines includes a lathe and a grinder.

20. The work instruction system according claim 6, wherein:
when the work state acquisition section obtains the start information from a stationary terminal, the work state acquisition section sets a current time as a start time,
when the work state acquisition section obtains the start information from a mobile terminal, the work state acquisition section sets an estimated start time different from the current time as the start time,
when the work state acquisition section obtains the finish information from the stationary terminal, the work state acquisition section sets the current time as a finish time, and
when the work state acquisition section obtains the finish information from the mobile terminal, the work state acquisition section sets an estimated finish time different from the current time as the finish time.

* * * * *